(12) United States Patent
Li et al.

(10) Patent No.: US 11,467,723 B2
(45) Date of Patent: Oct. 11, 2022

(54) METHOD AND ELECTRONIC DEVICE FOR DISPLAYING A MENU IN ASSOCIATION WITH AN APPLICATION ICON

(71) Applicant: Huawei Technologies Co., Ltd., Shenzhen (CN)

(72) Inventors: Xiaojuan Li, Beijing (CN); Wenmei Gao, Beijing (CN); Lei Wang, Beijing (CN)

(73) Assignee: HUAWEI TECHNOLGOIES CO., LTD., Shenzhen (CN)

( * ) Notice: Subject to any disclaimer, the term of this patent is extended or adjusted under 35 U.S.C. 154(b) by 0 days.

(21) Appl. No.: 16/622,702

(22) PCT Filed: Jun. 15, 2017

(86) PCT No.: PCT/CN2017/088504
§ 371 (c)(1),
(2) Date: Dec. 13, 2019

(87) PCT Pub. No.: WO2018/227495
PCT Pub. Date: Dec. 20, 2018

(65) Prior Publication Data
US 2020/0233554 A1 Jul. 23, 2020

(51) Int. Cl.
*G06F 3/0488* (2022.01)
*G06F 3/0482* (2013.01)
*H04M 1/72472* (2021.01)

(52) U.S. Cl.
CPC .......... *G06F 3/0488* (2013.01); *G06F 3/0482* (2013.01); *H04M 1/72472* (2021.01)

(58) Field of Classification Search
CPC .. G06F 3/0488; G06F 3/0482; G06F 3/04883; H04M 1/72586
See application file for complete search history.

(56) References Cited

U.S. PATENT DOCUMENTS 6,263,217 B1 * 7/2001 Park ...................... G06F 3/0482
455/566
10,261,672 B1 * 4/2019 Dolbakian .......... G06F 3/04817
(Continued)

FOREIGN PATENT DOCUMENTS

CN 103605450 A 2/2014
CN 103870190 A 6/2014
(Continued)

*Primary Examiner* — Kieu D Vu
*Assistant Examiner* — Alvaro R Calderon, IV
(74) *Attorney, Agent, or Firm* — Conley Rose, P.C.

(57) ABSTRACT

An electronic device having a touch-sensitive surface and a processing method for the electronic device. When a pressing operation on an application icon is detected on the touch-sensitive surface, a menu including m operation options is displayed on a display screen of the electronic device so that a user quickly performs different operations on an application program. The m operation options are determined based on at least one of: a quantity of times that an operation option is tapped, a time at which an operation option is taped, a location of the electronic device when an operation option is tapped, unread information in an application corresponding to the application icon, data obtained before the application is suspended, data obtained when the application runs in the background, or a communication object in the application.

20 Claims, 15 Drawing Sheets

(56) References Cited

U.S. PATENT DOCUMENTS

| | | | |
|---|---|---|---|
| 2003/0040945 A1* | 2/2003 | Fujita | G06Q 10/02 705/5 |
| 2005/0039141 A1* | 2/2005 | Burke | G06F 16/957 715/810 |
| 2005/0273729 A1* | 12/2005 | Kumashio | G06F 3/0482 715/825 |
| 2007/0050733 A1* | 3/2007 | Lee | H04N 5/44543 715/825 |
| 2007/0157125 A1* | 7/2007 | Peters | G06F 3/0482 715/837 |
| 2009/0315848 A1* | 12/2009 | Ku | G06F 3/0482 345/173 |
| 2010/0004031 A1* | 1/2010 | Kim | H04M 1/72583 455/566 |
| 2010/0050127 A1* | 2/2010 | Peng | G06F 3/0482 715/841 |
| 2010/0122194 A1* | 5/2010 | Rogers | G06F 3/0482 715/769 |
| 2010/0299638 A1* | 11/2010 | Choi | G06F 3/0488 715/835 |
| 2011/0041096 A1* | 2/2011 | Larco | G06F 3/04883 715/835 |
| 2011/0047491 A1* | 2/2011 | Hwang | G06F 3/0488 715/765 |
| 2012/0023452 A1* | 1/2012 | Li | G06F 3/0482 715/845 |
| 2012/0173976 A1* | 7/2012 | Herz | G06F 3/04815 715/716 |
| 2012/0185803 A1 | 7/2012 | Wang et al. | |
| 2013/0007604 A1* | 1/2013 | John | G06F 3/04812 715/255 |
| 2013/0166527 A1* | 6/2013 | Kasterstein | G06F 16/245 707/706 |
| 2013/0246970 A1* | 9/2013 | Helle | G06F 3/0482 715/822 |
| 2015/0020030 A1 | 1/2015 | Yoo | |
| 2015/0189070 A1* | 7/2015 | Baker | G06F 16/9537 715/738 |
| 2016/0156574 A1* | 6/2016 | Hum | G06Q 50/01 715/752 |
| 2016/0156584 A1* | 6/2016 | Hum | G06F 3/0482 715/752 |
| 2016/0231876 A1 | 8/2016 | Wang | |
| 2016/0259497 A1* | 9/2016 | Foss | G06F 3/0481 |
| 2016/0259518 A1* | 9/2016 | King | G06F 3/04883 |
| 2017/0046024 A1* | 2/2017 | Dascola | G06F 3/0416 |
| 2017/0060315 A1* | 3/2017 | Park | G06F 3/0482 |
| 2017/0083201 A1* | 3/2017 | Sharma | G06F 3/0486 |
| 2017/0109011 A1* | 4/2017 | Jiang | G06F 1/1694 |
| 2017/0277334 A1* | 9/2017 | Han | G06F 3/0488 |
| 2017/0277391 A1* | 9/2017 | Micheva | G06F 9/451 |
| 2017/0277396 A1* | 9/2017 | Chung | G06F 3/0482 |
| 2017/0357439 A1* | 12/2017 | Lemay | G06F 1/3265 |
| 2019/0012059 A1* | 1/2019 | Kwon | G06F 3/04842 |
| 2019/0265828 A1* | 8/2019 | Hauenstein | G06F 3/04842 |
| 2019/0369842 A1* | 12/2019 | Dolbakian | G06F 3/04817 |

FOREIGN PATENT DOCUMENTS

| | | |
|---|---|---|
| CN | 104915119 A | 9/2015 |
| CN | 105159547 A | 12/2015 |
| CN | 105718199 A | 6/2016 |
| CN | 106502492 A | 3/2017 |
| EP | 1761049 A2 | 3/2007 |
| WO | 2017027526 A1 | 2/2017 |

\* cited by examiner

METHOD AND ELECTRONIC DEVICE FOR DISPLAYING A MENU IN ASSOCIATION WITH AN APPLICATION ICON

CROSS-REFERENCE TO RELATED APPLICATIONS

This application is a National Stage of International Application No. PCT/CN2017/088504, filed on Jun. 15, 2017, which is hereby incorporated by reference in its entirety.

TECHNICAL FIELD

Embodiments of this application relate to the communications field, and in particular, to an electronic device having a display screen and a plurality of application programs (which are also referred to as applications or apps below) and a processing method for the electronic device.

BACKGROUND

In the prior art, a pressure touchscreen of an electronic device can detect pressing force of a user, and make different responses to a light press, a light tap, and a heavy press with different pressing force. When the user presses hard (heavily presses) an application icon, a translucent menu pops up on the electronic device. The menu includes some operation options of an application. The user selects one of the operation options, to use a function corresponding to the option. For example, the user heavily presses a "camera" icon on a mobile phone, and operation options included in a pop-up menu include photographing, slow-motion video recording, video recording, and selfie capturing.

However, the operation options included in the pop-up menu are all operation options predefined by a system, and cannot be changed based on an actual requirement of the user. Therefore, it is still inconvenient to use the operation options, affecting user experience.

SUMMARY

This application provides an electronic device and a processing method for the electronic device. When a user heavily presses an application icon, a menu including at least one operation option is determined and displayed based on at least one of: a quantity of times that an operation option is tapped, a time at which an operation option is tapped, a location of the electronic device when an operation option is tapped, unread information in an application, data obtained before an application is suspended, data obtained when an application runs in the background, and a communication object in an application, so that the operation option presented in the menu better meets a habit of the user. This improves user experience.

The term "electronic device" mentioned below in this application is a portable communications device that may include another function, such as a personal digital assistant (PDA) function and/or a portable multimedia player (PMP) function. The portable communications device is, for example, an electronic paper, an ebook, a TV, a computer, an in-vehicle display, a tablet computer, a smartphone, or a smartwatch. An example implementation of the portable electronic device includes, but is not limited to, a portable electronic device on which iOS®, Android®, Windows Phone, or another operating system is installed. Alternatively, another portable electronic device may be used, such as a laptop computer or a tablet computer having a touch-sensitive surface (such as a touchscreen display and/or a touchpad). It should be further understood that, in some embodiments, the electronic device is not a portable communications device, but a desktop computer having a touch-sensitive surface (such as a touchscreen display and/or a touchpad).

The electronic device usually supports a plurality of application programs, such as one or more of the following: a drawing application program, a presence application program, a word processing application program, a web page creation application program, a map application program, an electronic table application program, a game application program, a phone application program, a video conference application program, an email application program, an instant message application program, an exercise support application program, a photograph management application program, a digital camera application program, a digital video camera application program, a network browsing application program, a digital music player application program, and/or a digital video player application program.

Various application programs that may be executed on the electronic device may use at least one shared physical interface, such as the touch-sensitive surface. One or more functions of the touch-sensitive surface and corresponding information displayed on the electronic device may be adjusted and/or changed from one application program to another application program, or may be adjusted and/or changed within a corresponding application program In this way, the touch-sensitive surface of the electronic device may support the various application programs by using a user interface that is visual and clear to the user.

According to a first aspect, an embodiment of this application provides a method. The method is applied to an electronic device having a display screen and a plurality of applications. The display screen includes a touch-sensitive surface. The method includes: displaying at least one application icon on a home screen page of the electronic device; detecting, on the touch-sensitive surface, a first heavy pressing operation performed on a first application icon, where the first application icon is one of the at least one application icon, and the first application icon corresponds to a first application; displaying a first menu in response to the first heavy pressing operation, where the first menu includes at least one first operation option, the first operation option is an operation option provided in the first application, and the first operation option can be selected to start the first application and to enable a function corresponding to the selected first operation option; returning, by the electronic device, to the home screen page; detecting, on the touch-sensitive surface, a second heavy pressing operation performed on the first application icon; displaying a second menu in response to the second heavy pressing operation, where the second menu is different from the first menu, and the second menu includes at least one second operation option; and automatically adjusting, by the electronic device, the second operation option included in the second menu, where the second operation option is an operation option provided in the first application, and the second operation option can be selected to start the first application and to enable a function corresponding to the selected second operation option. Therefore, an operation option displayed on the electronic device after an application icon is heavily pressed can be changed.

Further, the second menu is different from the first menu, and at least one of the following cases is included: The function corresponding to the first operation option is different from the function corresponding to the second operation option; a quantity of first operation options is different from a quantity of second operation options; and a location of an operation option corresponding to a same function in the first menu is different from that in the second menu. In the two heavy pressing operations, the functions corresponding to the operation options displayed on the electronic device may be different, the quantities of operation options displayed on the electronic device may be different, and the locations of the operation options that correspond to the same function and that are in the menus may also be different.

Optionally, the method further includes: automatically adjusting, by the electronic device, a location of the second operation option in the second menu based on a quantity of times that the second operation option is tapped. Therefore, an operation option that is most frequently used by a user may be arranged on the top of a menu based on a usage habit of the user, and the user does not need to open a functional interface of an application level by level, saving time for the user.

Optionally, the method further includes: automatically adjusting, by the electronic device based on a time at which the second heavy pressing operation occurs, the second operation option included in the second menu. Therefore, an operation option that is most frequently used by the user in a time period may be arranged on the top of a menu based on usage habits of the user in different time periods.

Optionally, the method further includes: automatically adjusting, by the electronic device based on a location of the electronic device when the second heavy pressing operation occurs, the second operation option included in the second menu. Therefore, an operation option that is most frequently used by the user at a location or in a place may be presented, based on usage habits of the user at different locations or in different places, at a location that is more easily seen and tapped by the user.

Optionally, the method further includes: when the first application is a phone application, automatically adjusting, by the electronic device based on a missed call in the first application, the second operation option included in the second menu, where the function corresponding to the second operation option is dialing a phone number of the missed call.

Optionally, the method further includes: automatically adjusting, by the electronic device based on unread information in the first application, the second operation option included in the second menu, where the function corresponding to the second operation option includes at least one of the following: viewing the unread information, replying to the unread information, and dialing a phone number from which the unread information is sent. The user may conveniently dial back for the missed call, reply to an unread short message service message, view an unread notification message, reply to an unread WeChat message, and the like.

The unread information includes an unread short message service message, an unread instant messaging message, or an unread notification message.

Optionally, the method further includes: automatically adjusting, by the electronic device based on data obtained before the first application is suspended, the second operation option included in the second menu.

Optionally, the method further includes: automatically adjusting, by the electronic device based on data obtained when the first application runs in the background, the second operation option included in the second menu.

Optionally, the method further includes: when the first application has at least one communication object, automatically adjusting, by the electronic device based on a time for communicating with the at least one communication object, the second operation option included in the second menu. The user may conveniently communicate with a communication object with which the user comes into contact recently.

The communication object includes at least one of the following: a phone number, an application account number, a mail address, a user identifier, and a user name.

Optionally, the method further includes that at least one second operation option is an operation option preset by a system. An application-related operation option may be preset before a delivery of the electronic device, and the operation option may be an operation option conforming to a habit of most users, or an operation option related to an important application function.

Optionally, the second operation options are arranged from top to bottom in descending order of quantities of times of communicating with the communication object.

Optionally, the second operation options are arranged from top to bottom based on times for communicating with the communication object from late to early. In other words, a shorter time period between the time for communicating with the communication object and a current moment indicates an upper location at which the second operation option associated with the communication object is arranged.

Optionally, the second operation option includes information about a family member or information about a particular contact. The user may conveniently communicate with the family member and the particular contact, for example, through making a call, sending a short message service message, transferring, or sending a mail.

Optionally, the second operation option includes an operation option that may be executed in different application functional interfaces of the first application. When the operation option includes an executable option in a main interface of the first application and an executable option in a sub-interface of the first application, the user does not need to open the functional interfaces of the first application level by level, reducing operation steps.

Optionally, the second operation option includes all operation options that may be executed in an application functional interface in the first application. While a usage habit of the user is considered, a possibility that the user needs to use another operation option is also considered.

According to a second aspect, an embodiment of the present invention provides an electronic device. The electronic device has a function for implementing each method in the first aspect. The function may be implemented by using hardware, or may be implemented by using hardware executing corresponding software. The hardware or software includes one or more modules corresponding to the foregoing function.

According to a third aspect, an embodiment of the present invention provides an electronic device, including a processor, a memory, a display screen, and the like. The memory is configured to store data. The display screen includes a touch-sensitive surface, and is configured to: display various types of information and receive an instruction that is entered by a user by using the touch-sensitive surface. The processor is configured to perform each method in the first aspect.

An embodiment of the present invention further provides a computer readable storage medium. The computer readable storage medium stores an instruction. When the instruction runs on a computer, the computer is enabled to perform each method in the first aspect.

An embodiment of the present invention further provides a computer program product including an instruction. When the computer program product runs on a computer, the computer is enabled to perform each method in the first aspect.

An embodiment of the present invention further provides a graphical user interface on an electronic device. The electronic device includes a memory, a plurality of applications, and one or more processors configured to execute one or more programs stored in the memory. The graphical user interface includes a user interface displayed based on the method in any one of the first aspect or the possible implementations of the first aspect.

Based on the embodiments of the present invention, a problem that a menu popping up after a heavy press cannot be changed based on an actual requirement of a user can be resolved. In the embodiments of the present invention, the menu displayed in response to the heavy press of the user can be dynamically adjusted, and an arrangement manner of an operation option included in the menu better conforms to a usage habit of the user.

DESCRIPTION OF EMBODIMENTS

The following describes the embodiments of this application with reference to accompanying drawings.

The ordinal numbers such as "first" and "second" mentioned in the embodiments of this application shall only serve the purpose of differentiation unless the numbers definitely indicate a sequence based on a context.

Figure 1:
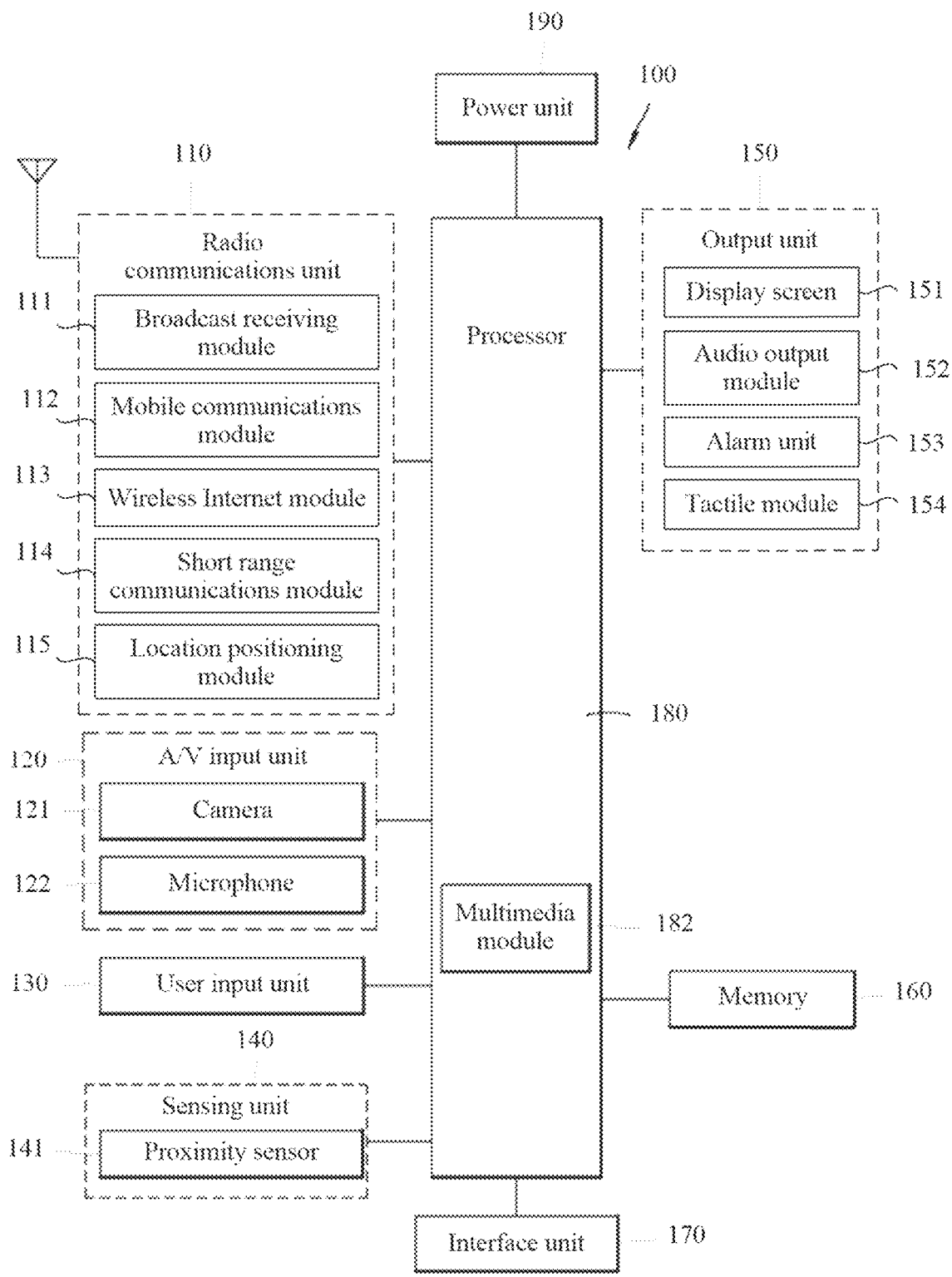
FIG. 1 is a block diagram of an electronic device according to an embodiment of this application.

FIG. 1 is a block diagram of an electronic device 100 according to an embodiment of this application.

As shown in FIG. 1, the electronic device 100 includes a wireless communications unit 110, an A/V (audio/video) input unit 120, a user input unit 130, a sensing unit 140, an output unit 150, a memory 160, an interface unit 170, a processor 180, a power unit 190, and the like. FIG. 1 shows the electronic device 100 having the various components. However, it should be understood that implementation of the electronic device 100 not necessarily requires all the shown components. The electronic device 100 may be implemented by using more or fewer components.

The following explains each of the foregoing components.

The wireless communications unit 110 usually includes one or more components. The component allows radio communication between the electronic device 100 and a wireless communications system or a network in which the electronic device is located. For example, the wireless communications unit 110 may include at least one of a broadcast receiving module 111, a mobile communications module 112, a wireless Internet module 113, a short range communications module 114, or a location positioning module 115.

The broadcast receiving module 111 receives a broadcast signal and/or broadcast-related information from an external broadcast management server by using a broadcast channel. The broadcast channel includes a satellite channel and/or a terrestrial channel. The broadcast management server is a server configured to generate and transfer the broadcast signal and/or the broadcast-related information, or a server configured to receive the generated broadcast signal and/or the generated broadcast-related information and transfer the generated broadcast signal and/or the generated broadcast-related information to the electronic device. The broadcast signal and/or the broadcast-related information that are/is received by the broadcast receiving module 111 may be stored in the memory 160.

The broadcast signal may include a TV broadcast signal, a radio broadcast signal, or a data broadcast signal, and may further include a broadcast signal obtained by combining the data broadcast signal with the TV broadcast signal or the radio broadcast signal.

An example of the broadcast-related information may include information related to a broadcast channel, a broadcast program, or a broadcast service provider. The broadcast-related information may be provided by using a mobile communications network. In this case, the broadcast-related information may be received by using the mobile communications module 112.

The broadcast-related information may exist in various forms. For example, the broadcast-related information may exist in a form of an electronic program guide (EPG) of digital multimedia broadcasting (DMB), or in a form of an electronic service guide (ESG) of digital video broadcasting-handheld (DVB-H).

The broadcast receiving module 111 receives the broadcast signal by using various broadcast systems, and may receive the data broadcast signal by using a digital broadcast system. The broadcast receiving module 111 may be properly configured to receive the broadcast signal from another broadcast system and the foregoing digital broadcast system.

The mobile communications module 112 transfers, on the mobile communications network, a radio signal to at least a base station, an external terminal, or a server; and receives, on the mobile communications network, a radio signal from at least the base station, the external terminal, or the server. The radio signal may include a voice call signal, a video call signal, or various types of data signals corresponding to text/multimedia message transmission and reception.

The wireless Internet module 113 is a module for wireless Internet access. The wireless Internet module 113 may be internally or externally coupled to the electronic device 100. A wireless Internet technology may include a WLAN, Wi-Fi, wireless broadband, Worldwide Interoperability for Microwave Access, and high speed downlink packet access.

The short range communications module 114 is a module for short range communication. A used short range communications technology may include Bluetooth, radio frequency identification (RFID), the Infrared Data Association (IrDA), ultra-wideband (UWB), or ZigBee.

The location positioning module 115 is a module configured to obtain a location of the electronic device 100 through identification or in another manner. The location positioning module 115 may be a GPS (Global Positioning System) module. The GPS module 115 may calculate location and time information by using three satellites, and correct the calculated location and time information by using another satellite. In addition, the GPS module 115 continuously calculates a current location in real time, and calculates speed information by using location information.

The A/V input unit 120 is configured to receive an audio signal or a video signal. The A/V input unit 120 may include a camera 121 and a microphone 122. The camera 121 processes, in a video capture mode or in an image capture mode, a video obtained by using an image capture apparatus or image data of a still image. A processed image frame may be displayed on the following display screen 151.

The image frame processed by using the camera 121 may be stored in the following memory 160 or transferred by using the wireless communications unit 110. Two or more cameras 121 may be provided based on a configuration of the electronic device.

The microphone 122 may receive a sound (an audio signal) when the electronic device 100X) is in a particular mode (such as in a phone call mode, in a recording mode, or in a speech recognition mode). The audio signal is processed to obtain digital data. The digital data may be output and converted into a format that can be sent to a mobile communications base station in a phone call mode by using the mobile communications module 112. The microphone 122 may implement various noise cancellation (or suppression) algorithms to cancel (or suppress) noise or interference generated in a process of receiving and transferring the audio signal.

The user input unit 130 may generate input data based on a command entered by a user, to control various operations of the electronic device 100. The user input unit 130 allows the user to enter various types of information, and may include a keyboard, a dome switch (dome switch), a touchpad (such as a touch sensitive component, where the touchpad detects a change in an aspect such as resistance, pressure, or capacitance when the touchpad is touched), a jog wheel (jog wheel), a jog switch (jog switch), and the like.

The sensing unit 140 detects, for example, a current situation (or a status) of an on or off state of the electronic device 100, a location of the electronic device 100, existence or inexistence of a touch performed by a user on the electronic device 100, an orientation of the electronic device 100, a direction of the electronic device 100, and acceleration and deceleration movement of the electronic device 100; and generates a command or a signal used to control an operation of the electronic device 100. For example, when the electronic device 100 is implemented as a smartphone, the sensing unit 140 (such as a gravity sensor) may sense a landscape mode or a vertical mode of the smartphone. In addition, the sensing unit 140 can detect whether the power unit 190 supplies power.

The output unit 150 is configured to provide output (such as an audio signal, a video signal, an alarm signal, or a vibration signal) in a visual manner, an auditory manner, and/or a tactile manner. The output unit 150 may include the display screen 151, an audio output module 152, an alarm unit 153, a tactile module 154, and the like.

The display screen 151 may display information processed on the electronic device 100. For example, when the electronic device 100 is in a phone call mode, the display screen 151 may display a call-related user interface (UI) or a call-related graphical user interface (GUI).

When the display screen 151 and the touchpad are overlapped in a layering manner to form a touchscreen, the display screen 151 includes a touch-sensitive surface. Therefore, the display screen 151 may serve as an input apparatus and an output apparatus. The display screen 151 may include at least one of a liquid crystal display (LCD), an organic light-emitting diode (OLED) display, a three-dimensional (3D) display, or an electronic ink display.

Some of these displays may be configured as transparent, so that the outside can be seen through the displays. The displays may be referred to as transparent displays. A representative example of the transparent displays may include a transparent organic light-emitting diode (TOLED) and the like. A rear surface of the display screen 151 may be translucent. Based on such a configuration, the user can see an object on a rear side of a body through the display screen 151 of the body.

Based on a configuration status of the electronic device 100, for a quantity, the display screen 151 may be implemented by using two or more display screens. For example, a plurality of display screens may be integrally or independently disposed on one surface, or disposed on different surfaces.

Herein, if there is a layered structure between the display screen 151 and a touch-sensitive sensor (which is also referred to as a "touch sensor" below), the structure may be referred to as a touchscreen or a display screen having a touch-sensitive surface. The display screen 151 (which is also referred to as a "touchscreen" 151 below) may serve as an input apparatus other than an output apparatus. The touch sensor may be implemented as a touch film, a touch sheet, a touchpad, or the like.

The touch sensor may be configured to convert, into an electrical input signal, pressure imposed on a particular part of the display screen 151 or capacitance occurring at a particular part of the display screen 151. In addition, the touch sensor may be configured to: not only sense a touched location and a touched area, but also sense touch pressure, and make different responses to a light press, a light tap, and a heavy press with different pressing force. For the light press, the light tap, and the heavy press described in this application, refer to functions of "Force Touch" and "3D Touch" of Apple Inc. For details, refer to https://en.wikipedia.org/wiki/Force_Touch#3D_Touch. The light press, the light tap, and the heavy press are technologies implemented on a pressure touchscreen. The heavy press is pressing a touch-sensitive surface by using greater force than the light press. A shortcut operation option supported by an application may pop up by heavily pressing an icon of the application on a desktop (a home screen page) of a mobile phone. For example, a menu including three shortcut operation options including "Create an alarm", "Start timing by using a stopwatch", and "Start timing" may pop up by heavily pressing "Clock".

When touch input is sensed by using the touch sensor, a corresponding signal is transferred to a touch processor (not shown in the figure). The touch processor processes the received signal, and then transfers corresponding data to the processor 180. Therefore, the processor 180 may determine a specific touched area of the display screen 151 and a touch pressure value.

Still referring to FIG. 1, a proximity sensor 141 may be disposed in an internal area of the electronic device covered by the touchscreen, or near the touchscreen. The proximity sensor 141 may be set to an example of the sensing unit 140. The proximity sensor 141 indicates a sensor configured to use an electromagnetic field or infrared to sense, without mechanical contact, whether the electronic device is proximate to an object on a to-be-sensed surface or close to an object disposed on a to-be-sensed surface. Compared with a touch sensor, the proximity sensor 141 has a longer life span and enhanced practicability.

The audio output module 152 may output, in a mode such as a call signal receiving mode, a call mode, a recording mode, a voice recognition mode, or a broadcast receiving mode, audio data received from the wireless communications unit 110 or stored in the memory 160. In addition, the audio output module 152 may provide audio output (such as a call signal receiving sound or a message receiving sound) related to a particular function executed on the electronic device 100. The audio output module 152 may include a receiver, a speaker, a buzzer, and the like.

The alarm unit 153 outputs a signal used to provide a notification about occurrence of an event of the electronic device 100. The event generated on the electronic device 100 may include call signal reception, message reception, keyboard signal input, touch input, and the like. The alarm unit 153 not only may output a video signal or an audio signal, but also may output another type of signal, such as a signal used to provide a notification about occurrence of an event in a vibration manner. Herein, the video signal or the audio signal may be output by using the display screen 151 or the audio output module 152. Therefore, the display screen 151 or the audio output module 152 may be classified as a part of the alarm unit 153.

The tactile module 154 generates various tactile effects that can be sensed by the user. A representative example of a tactile effect generated by using the tactile module 154 is a vibration. Strength and a mode of the tactile module 154 may be controlled. For example, different vibrations may be output in a combination manner or may be output sequentially.

In addition to the vibration, the tactile module 154 may further generate various types of other tactile effects such as a stimulus effect (for example, a pin arrangement structure that vertically moves relative to contact skin, spray force obtained when air passes through a spray outlet and suction force obtained when air passes through a suction inlet, contact on skin, electrode contact, or electrostatic force), and present a thermal feeling effect again by using a component that can absorb heat or emit heat.

The tactile module 154 may be implemented to allow the user to sense a tactile effect by using a finger or a muscle of an arm, and transmit the tactile effect through direct contact. Two or more tactile modules 154 may be provided based on a configuration of the electronic device 100.

The memory 160 may store a software program that is executed by the processor 180 and that processes and controls an operation, or may temporarily store input or output data (such as a phone book, a message, a still image, or a video). The memory may further store data related to various modes of a vibration and an audio signal that are output when a touch is input to the touchscreen.

The memory 160 may be implemented by using any type of proper storage medium. The storage medium includes a flash memory type, a hard disk type, a micro multimedia card, a memory card (such as an SD or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In addition, the electronic device 100 may perform an operation related to a network storage apparatus that is on the Internet and that executes a storage function of the memory 160.

The interface unit 170 serves as a connection channel between the electronic device 100 and an external device. The interface unit 170 may receive data from the external device. Power may be supplied to the electronic device 100 by using the interface unit 170, and then the power is transferred to each component in the electronic device 100. The interface unit 170 may enable the data to be transmitted from the inside of the electronic device 100 to the external device. The interface unit 170 may include a wired/wireless headset port, an external charger port, a wired/wireless data port, a memory card port, a port configured to couple to an apparatus having an identification module, an audio input/output (I/O) port, a video input/output (I/O) port, and/or a headset port.

The identification module may be a chip or a card storing various information required to authenticate usage permission for the electronic device 100. The identification module may include a user identity module (UIM), a subscriber identity module (SIM), a universal subscriber identity module (USIM), and/or the like. In addition, the apparatus (which is referred to as an "identification apparatus" below) having the identification module may be implemented by using a smartcard. Therefore, the identification apparatus may be coupled to the electronic device 100 by using a port.

The interface unit 170 may be used as a path for supplying power from an external expansion device to the electronic device 100 when the electronic device 100 is connected to the external expansion device, or may be used as a path for transmitting, to the electronic device 100, various command signals entered by the user from an expansion device. The various command signals or the power entered from the expansion device may be used as a signal operation performed to identify that the electronic device is accurately installed on the expansion device.

The processor 180 usually controls an integral operation of the electronic device 100. For example, the processor 180 performs control and processing that are associated with a phone call, data communication, a video call, and the like. The processor 180 may include a multimedia module 182. The multimedia module 182 is configured to present multimedia data again. The multimedia module 182 may be configured as a part of the processor 180 or an independent component.

The processor 180 may sense a specific touched area of the display screen 151 and a touch pressure value. Touches are classified as a light press, a light tap, and a heavy press based on different touch pressure values. When the processor 180 senses that the display screen 151 is heavily pressed, an application associated with an application icon in a heavily pressed area is determined, an operation option is generated for an operation of the application, and the operation option is displayed on the display screen 151 by using a menu.

The processor 180 may also perform mode identification processing, so that writing input or drawing input on a touchscreen 151 is identified as a text or an image.

In addition, the processor 180 may execute a lock status when a status of the electronic device 100 meets a preset condition, to limit the user in entering a control command for the application. In addition, the processor 180 may control, based on touch input sensed on the touchscreen 151 of the electronic device 100 in a lock status, a lock image displayed in the lock status.

The power unit 190 receives an external power supply and an internal power supply under control of the processor 180, and supplies proper power required to operate a corresponding part and a corresponding component.

Various implementations described in this specification may be implemented in a computer readable medium or a medium similar to a computer readable medium by using, for example, software, hardware, or any combination of software and hardware.

For a hardware implementation, the embodiment described herein may be implemented by using at least one of an application-specific integrated circuit (ASIC), a digital signal processor (DSP), a digital signal processing device (DSPD), a programmable logic device (PLD), a field programmable gate array (FPGA), a central processing unit (CPU), a general purpose processor, a microprocessor, and an electronic unit that are designed to execute a function described herein. In some cases, this embodiment may be implemented by using the processor 180.

For a software implementation, the embodiment of a program, a function, or the like described herein may be implemented by using an independent software module. Each software module may execute one or more functions or operations described herein.

Software code can be implemented by using a software application compiled by using any proper programming language. The software code may be stored in the memory 160 and executed by using the processor 180.

In addition, in an example embodiment, information processed on the electronic device 100 may be displayed by using the display screen 151.

Figure 2:
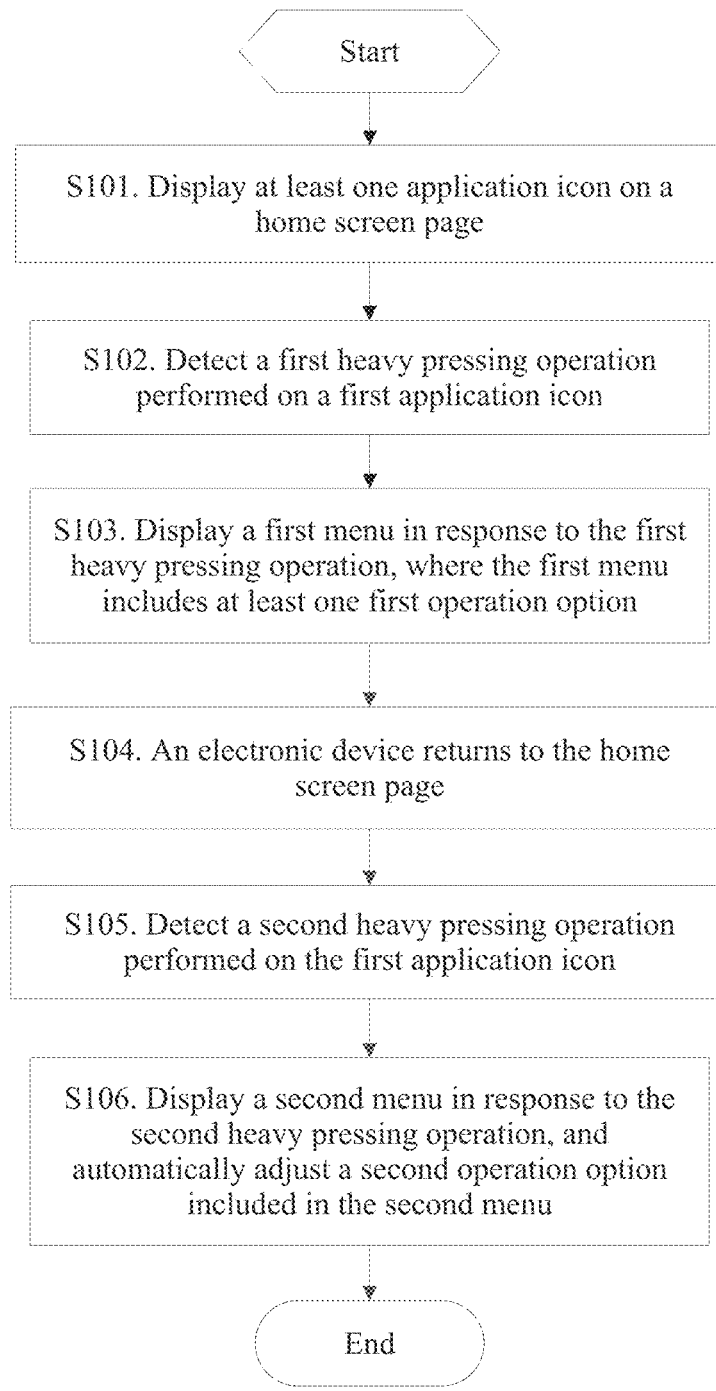
FIG. 2 is a processing method for an electronic device according to an embodiment of this application.

FIG. 2 is a processing method for an electronic device according to an embodiment of this application. As shown in FIG. 2, the method includes the following steps.

Step S101: Display at least one application icon on a home screen page of the electronic device.

The processing method in this embodiment is applied to an electronic device having a display screen and a plurality of applications. The display screen includes a touch-sensitive surface. The touch-sensitive surface can sense a location pressed by a user and pressing force. A smartphone is used as an example. Generally, when components are initialized after the smartphone is started, the smartphone has a home screen (home screen) initially displayed on a display screen, and the home screen is also referred to as a home screen page. A plurality of application icons may be displayed on the home screen page. For example, a plurality of application icons such as Camera, Photos, Phone, WeChat, and Amap are displayed on the home screen page of the smartphone. In addition to the home screen page, the smartphone may further include at least one another screen page. The user may add an icon of an application program to the home screen page or the another screen page, and quickly open the corresponding application program by tapping the application icon. The application icon on the home screen page may be moved to the another screen page, and an application icon on the another screen page may also be moved to the home screen page.

Step S102: Detect a first heavy pressing operation performed on a first application icon.

In this step, the first heavy pressing operation performed on the first application icon is detected on the touch-sensitive surface, the first application icon is one of the at least one application icon, and the first application icon corresponds to a first application. A smartphone is still used as an example. The smartphone detects, on the touch-sensitive surface, a first heavy pressing operation performed on a camera application icon.

Step S103: Display a first menu in response to the first heavy pressing operation, where the first menu includes at least one first operation option.

The first operation option is an operation option provided in the first application, and the first operation option can be selected to start the first application and to enable a function corresponding to the selected first operation option. The first menu may be displayed in response to the first heavy pressing operation on the camera application icon. The operation option included in the first menu may be "Photograph". When the operation option "Photograph" is tapped, a camera application may be started to enter a photographing interface.

Step S104: The electronic device returns to the home screen page.

In this step, after starting the camera application to enter the photographing interface, the electronic device may exit the camera application and return to the home screen page. The user may return to the home screen page by pressing a home button or tapping a main menu key.

Step S105: Detect a second heavy pressing operation performed on the first application icon.

In this step, the smartphone detects, on the touch-sensitive surface, a second heavy pressing operation performed on a phone application icon. The second heavy pressing operation is another heavy pressing operation after the first heavy pressing operation. Another heavy pressing operation may be included between the second heavy pressing operation and the first heavy pressing operation. Alternatively, there may be no heavy pressing operation between the second heavy pressing operation and the first heavy pressing operation.

Step S106: Display a second menu in response to the second heavy pressing operation, and automatically adjust a second operation option included in the second menu.

In this step, the second menu is displayed in response to the second heavy pressing operation. The second menu is different from the first menu, and the second menu includes at least one second operation option. The electronic device automatically adjusts the second operation option included in the second menu. The second operation option is also an operation option provided in the first application. The second operation option can also be selected to start the first application and to enable a function corresponding to the selected second operation option.

For example, the second menu may be displayed in response to a second heavy pressing operation performed on a camera application icon. The operation option included in the second menu may be "Record a video". When the operation option "Record a video" is tapped, a camera application may be started to enter a recording interface.

The second menu is different from the first menu, and at least one of the following cases is included: The function corresponding to the first operation option is different from the function corresponding to the second operation option, for example, the first operation option is "Photograph", and the second operation option is "Record a video"; a quantity of first operation options is different from a quantity of second operation options, for example, the first menu includes one first operation option "Photograph", and the second menu includes two second operation options: "Record a video" and "Capture a selfie" respectively; and a location of an operation option corresponding to a same function in the first menu is different from that in the second menu, for example, in the first menu, the first operation option "Photograph" is arranged above the second operation option "Record a video", but in the second menu, the second operation option "Record a video" is arranged above the first operation option "Photograph".

In this embodiment of this application, the electronic device automatically adjusts the second operation option included in the second menu. An automatic adjustment process does not require intervention of the user. The automatic adjustment is not implemented based on input of the user. The user manually adjusts content or a location of an operation option by using the input. This does not belong to a scope of the automatic adjustment in this embodiment of this application. For example, for a phone application, an operation option change related to a frequent contact and occurring when the user manually changes a frequent contact kept by the user belongs to a scope different from the scope to which the automatic adjustment described in this application belongs.

The electronic device may automatically adjust, based on at least one of the following factors, the second operation option included in the second menu. The factors include: a quantity of times that the second operation option is tapped, a time at which the second heavy pressing operation occurs, a location of the electronic device when the second heavy pressing operation occurs, data obtained before the first application is suspended, data obtained when the first application runs in the background, and the like. A combination of the foregoing determined factors may be preset by a system or the user. During an actual operation, any one of the foregoing determined factors may be selected based on a requirement, or the foregoing determined factors may be randomly combined.

Figure 3:
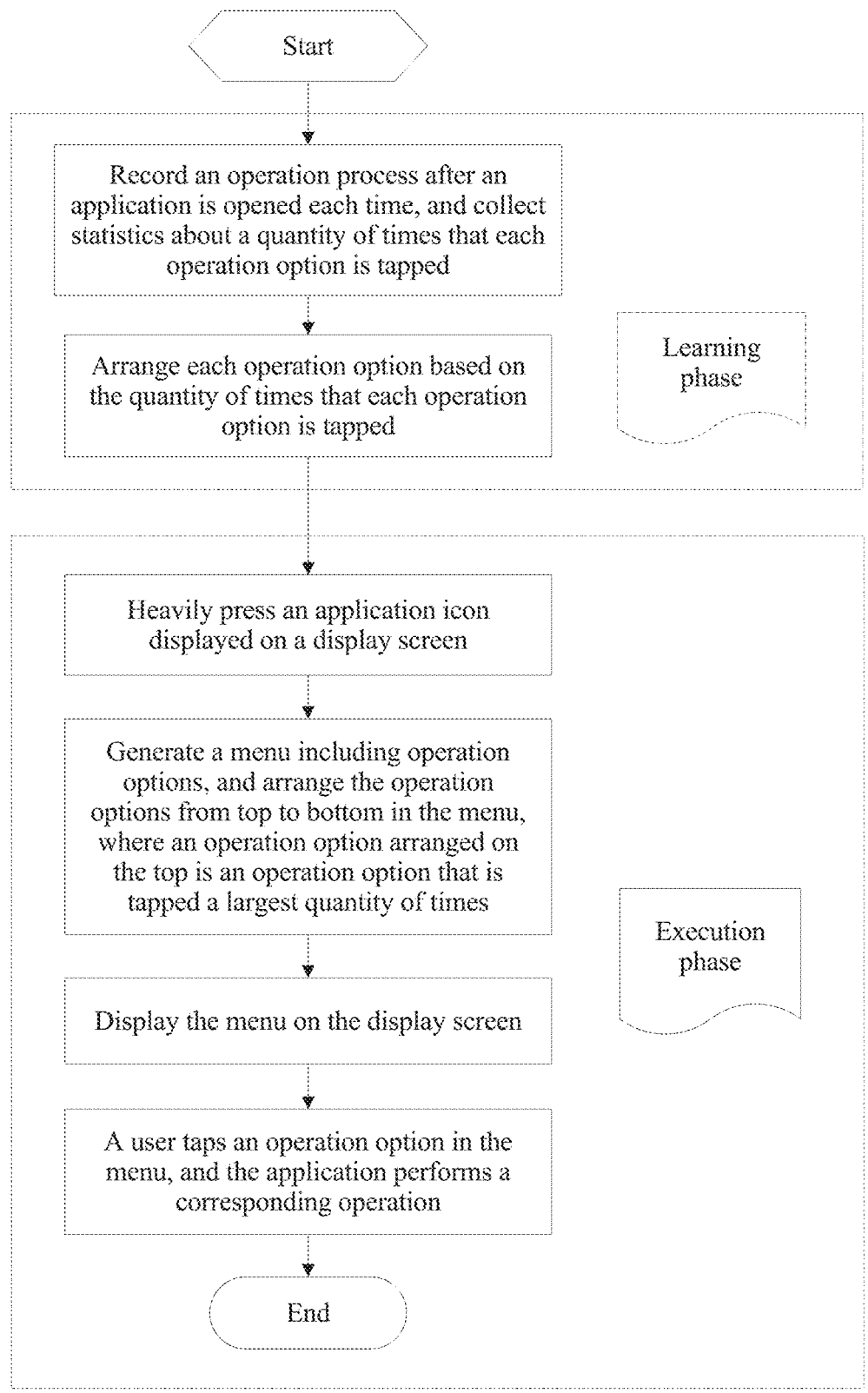
FIG. 3 is a flowchart for determining an operation option and displaying the operation option in a form of a menu according to an embodiment of this application.

Referring to FIG. 3, the following describes in detail a process of automatically adjusting and displaying the second operation option based on, for example, the quantity of times that the second operation option is tapped.

In this application, an operation process of an application program may be divided into a learning phase and an execution phase. In the learning phase, a processor 180 learns and collects statistics about a usage habit of a user and running data of an application. In the execution phase, the processor determines, based on a statistical result, an operation option included in a menu, and displays the operation option. Each operation performed on the application program may be considered as both the learning phase and the execution phase.

In the learning phase, the processor 180 records an operation process after the user opens an application each time, collects statistics about a quantity of times that each operation option in each functional interface of the application is tapped, and arranges each operation option based on a value of the quantity of times that each operation option is tapped.

In the execution phase, the processor 180 determines at least one of the second operation option based on the quantity of times that the operation option is tapped, and displays the second operation option in a form of a menu for the user.

At least one application icon is displayed on the display screen of the electronic device. When a heavy pressing operation performed on the application icon is detected, the processor 180 generates a second menu including the at least one second operation option. The second operation option in the second menu is arranged in the foregoing order. In other words, an operation option arranged on the top of the second menu is tapped a largest quantity of times. Quantities of times that operation options arranged in the second menu are tapped sequentially descend from top to bottom.

When the second heavy pressing operation is detected, the second menu is displayed on the display screen. The user taps a second operation option in the second menu, so that an application performs an operation corresponding to the operation option.

As described above, the electronic device 100 disclosed in this application may use any proper form, including but not limited to a smartphone 200 in FIG. 4(a) to FIG. 4(f). Referring to FIG. 4(a) to FIG. 4(f), the following discusses more details about the smartphone 200.

One or more application programs are installed on the smartphone 200. The application program has different statuses: running stop (the application program is terminated or is not started), inactive (the application program is in the foreground, but no longer receives an event, for example, the user locks a device when an app is active), active (the application program is in use), background running (the application program is not displayed on a screen, but still executes code), and suspended (the application program still resides in a memory, but is neither displayed on a screen nor executes code). Data obtained before the application program is suspended and data obtained when the application program runs in the background are stored in a memory 160, so that the stored data is displayed to the user when the application program enters the foreground again.

As shown in FIG. 4(a) to FIG. 4(f), the processor 180 may display (or may enable the display screen 251 to display) at least one application icon 201 on a display screen 251.

In the following first to fourth embodiments of this application, an operation process of an application corresponding to an application icon is separately described by using an example of an application such as Map, Phone, or Messages. The application may be various applications used on an electronic device on which iOS®, Android®, Windows Phone®, or another operating system is installed, and includes but is not limited to Phone, Messages, Browser, Camera, Video, Memo, Reminder, Clock, Calendar, Weather, Settings, Music, File management, Share, WeChat, Weibo, Tencent, Map, Mail, Graphics library, Recycle bin. Application store, Calculator, News, Games, and the like.

Based on the following technical solutions disclosed in this application, the second menu is displayed on the display screen in response to the second heavy pressing operation performed when the user heavily presses the application icon, and the second menu includes at least one second operation option. By selecting an operation option included in a menu, the user can directly reach a wanted interface without opening a functional interface of an application level by level. The at least one second operation option is determined based on at least one of a quantity of times that the operation option is tapped, a time at which the second heavy pressing operation occurs, a location of the electronic device when the operation option is tapped, unread information in the application, data obtained before the application is suspended, data obtained when the application runs in the background, and a communication object in the application. A specific implementation is as follows.

The following four embodiments are specific embodiments in different application scenarios. An Amap application is used as an example in the first embodiment, a phone application is used as an example in the second embodiment, a short message service message application is used as an example in the third embodiment, and an Alipay application and a camera application are used as examples in the fourth embodiment. With reference to the following first to fourth embodiments, a person skilled in the art may better understand the solutions of this application, and the foregoing objective, features, and advantages of this application can be more obvious and more understandable. The process of automatically adjusting the second operation option included in the second menu is emphasized in the following four embodiments.

First Embodiment

Referring to content shown in FIG. 4(a) to FIG. 4(f) and FIG. 5A and FIG. 5B, an operation process of a map application corresponding to an icon 201 is described by using Amap as an example.

In a learning phase, a processor 180 records a process of using an Amap application by a user each time. A main interface of the Amap application and some level-2 functional interfaces of the main interface are described first.

There are four different operation options "Search", "Nearby", "Route", and "Mine" in the main interface of Amap. The user may select the operation option "Search" in the main interface, and enter "XXX" in an input box. Optionally, the "XXX" is a location, a bus, a metro, or the like. The location may be a street, a building, a scenic spot, or the like. After the user completes input in the input box, the application provides one or more corresponding search results. After the user selects a search result A from the one or more search results, Amap enters a level-2 functional interface.

There are three different operation options "Search nearby", "Go", and "Navigate" in the level-2 functional interface of the operation option "Search". The user may select the operation option "Navigate" in the level-2 interface to enter a navigation functional interface of the map application. In the navigation functional interface, the map application guides the user to drive from a current location to a location corresponding to the search result A. Alternatively, the user may select the operation option "Search nearby" in the level-2 interface to enter a search interface of the map application. In the search interface, the user may search for a food, a hotel, a parking lot, or the like near the search result A.

Optionally, the user may alternatively select the operation option "Route" in the main interface. In a level-2 functional interface of the operation option "Route", the user may go from a start point location to A by selecting one of three manners: "Drive", "Take a bus", or "Walk".

The processor 180 records and collects statistics about a usage operation after the user opens the Amap application each time, records an association relationship between a main interface operation and a level-2 functional interface operation, and stores a result in a memory 160 according to a format in the following Table 1.

TABLE 1

| | Amap | | | | | | | | | | | |
|---|---|---|---|---|---|---|---|---|---|---|---|---|
| | | | | | Level-2 interface operation | | | | | | | |
| | Main interface operation | | | | Search | | | Take | | Time | | Location |
| Number | Search | Nearby | Route | Mine | nearby | Go | Navigate | Drive | a bus | Walk | Daytime | Night | Home | Company |
| 1 | 1 | | | | | | 1 | | | | | ✓ | ✓ | |
| 2 | | 1 | | | | | | | 1 | | | ✓ | | ✓ |
| 3 | 1 | | | | | 1 | | | | | | ✓ | ✓ | |
| 4 | 1 | | | | | 1 | | | | | | ✓ | ✓ | |
| 5 | 1 | | | 1 | | | | | | | ✓ | | | ✓ |
| 6 | | 1 | | | | | | | 1 | | ✓ | | | ✓ |
| 7 | | | 1 | | | | | | | 1 | | ✓ | | ✓ |
| 8 | 1 | | | | | 1 | | | | | | ✓ | ✓ | |
| 9 | | 1 | | | | | | | | 1 | ✓ | | | ✓ |
| 10 | 1 | | | | 1 | | | | | | ✓ | | | ✓ |

A record having a number of 1 indicates that in the usage, the user sequentially selects "Search" and "Navigate" respectively from the operation options in the main interface and the operation options in the level-2 interface, and the usage is an operation performed by the user at home at night. Referring to the record having the number of 1, content indicated by a remaining record can be understood.

Based on records in Table 1, without considering a time factor and a location factor, a commonly-used operation of the user in the main interface is "Search", and a next commonly-used operation after "Search" is "Navigate". When the location factor is considered, a commonly-used operation in the main interface when the user is near a company is "Route", and a next commonly-used operation after "Route" is "Walk". When the time factor is considered, a commonly-used operation that is of the user at night and that is in the main interface is "Search", and a next commonly-used operation after "Search" is "Navigate".

For ease of description, an included operation option in a level-2 interface of the operation option "Nearby" or "Mine" in the main interface is omitted in Table 1. During actual usage, a person skilled in the art may add an option to Table 1 based on an actual case.

In Table 1, location factors are distinguished based on the two locations: at home and in the company, and time factors are distinguished based on two time periods: in daytime and at night. These are only examples, and are not used to limit this application. A person skilled in the art may further subdivide the location or the time based on a requirement.

In an execution phase, the processor 180 determines a currently executable operation option and displays the operation option to the user in a form of a menu 202. How to determine and adjust a second operation option included in a second menu is separately described below in different cases.

In the following first to fourth cases, before the user heavily presses the icon 201, the map application is in a running stop state. In the following fifth and sixth cases, before the user heavily presses the icon 201, the map application is in a background running state or in a suspended state.

First Case

Figure 4A:
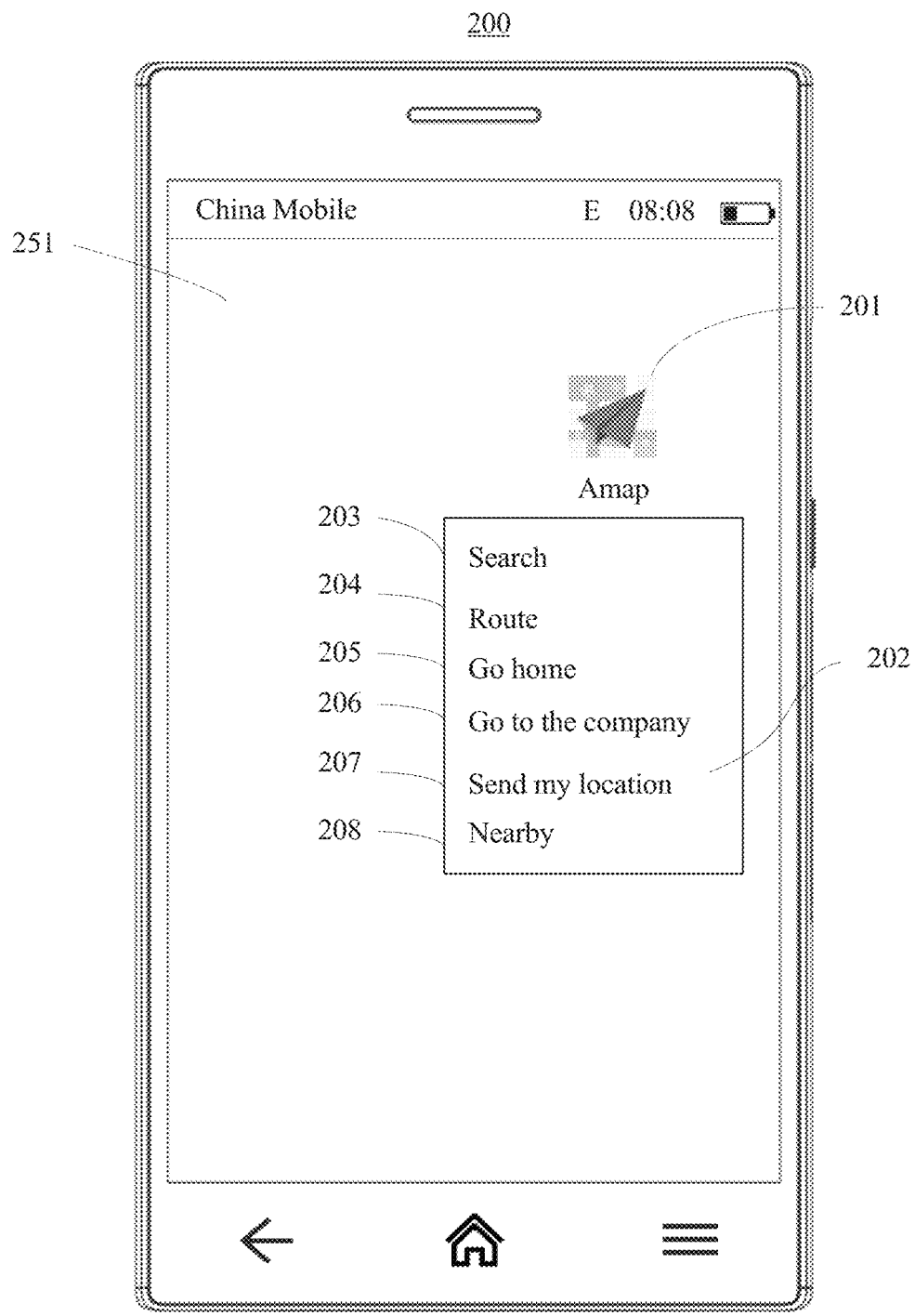
FIG. 4(a) to FIG. 4(f) are schematic diagrams of an operation option displayed when a map application icon is heavily pressed according to an embodiment of this application.

In the first case, when the user heavily presses the icon 201, the processor 180 determines, based on Table 1 recorded in the learning phase, that an operation that is in the main interface and that is most commonly used by the user is "Search", and a relatively commonly-used operation is "Route". Therefore, as shown in FIG. 4(a), in a menu 202 displayed in response to the heavy press, operation options 203 to 208 arranged from top to bottom are respectively: 203 "Search", 204 "Route", 205 "Go home", 206 "Go to the company", 207 "Send my location", and 208 "Nearby". The operation options 203 and 204 are determined based on quantities of times that the user taps the operation options, and the operation options 205 to 208 are options preset by a system. The operation option 203 "Search" is an operation option that is tapped a largest quantity of times.

Second Case

Figure 4B:
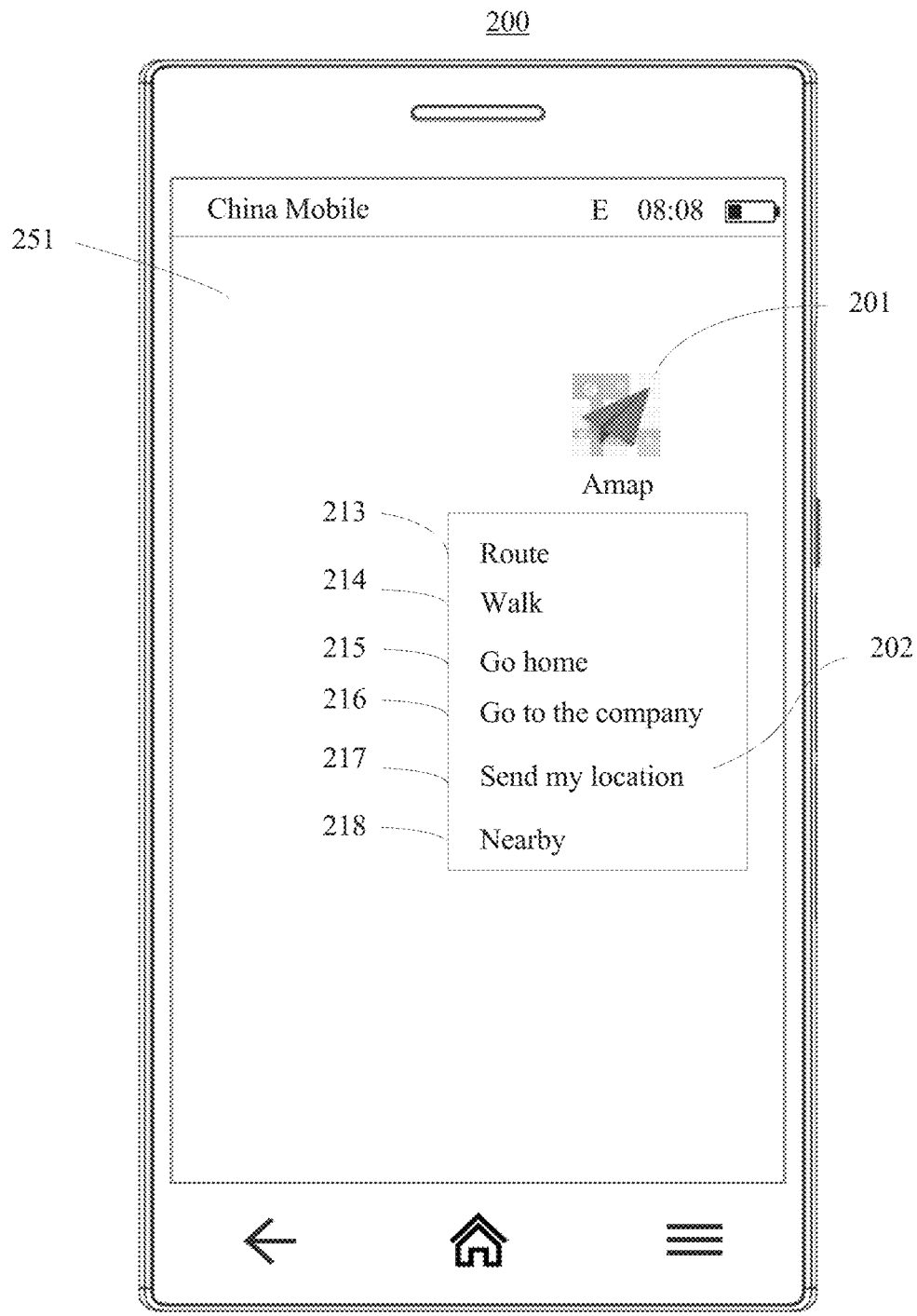

In the second case, when the user heavily presses the icon 201 in the company, the processor 180 determines, based on Table 1 recorded in the learning phase, that an operation that is in the main interface and that is most commonly used by the user when the user is in the company is "Route", and an operation most commonly used in the level-2 functional interface is "Walk". Therefore, as shown in FIG. 4(b), operation options 213 to 218 arranged from top to bottom in the menu 202 are respectively: 213 "Route", 214 "Walk", 215 "Go home", 216 "Go to the company", 217 "Send my location", and 218 "Nearby". The operation options 213 and 214 are determined based on a location of a smartphone, and the operation options 215 to 218 are options preset by a system. When the location of the smartphone 200 is an address of the company in which the user is located, the operation option 213 "Route" is an operation option that is tapped a largest quantity of times.

In the second case, the operation options 213 and 214 are respectively an operation most commonly used in the main interface and an operation most commonly used in the level-2 functional interface. Optionally, an operation option 214' may be alternatively the operation "Search" that is relatively commonly-used in the main interface. Alternatively, optionally, operation options 213" and 214" are respectively the operation "Walk" and the operation "Search nearby" that are most commonly used in the level-2 functional interface.

Third Case

Figure 4C:
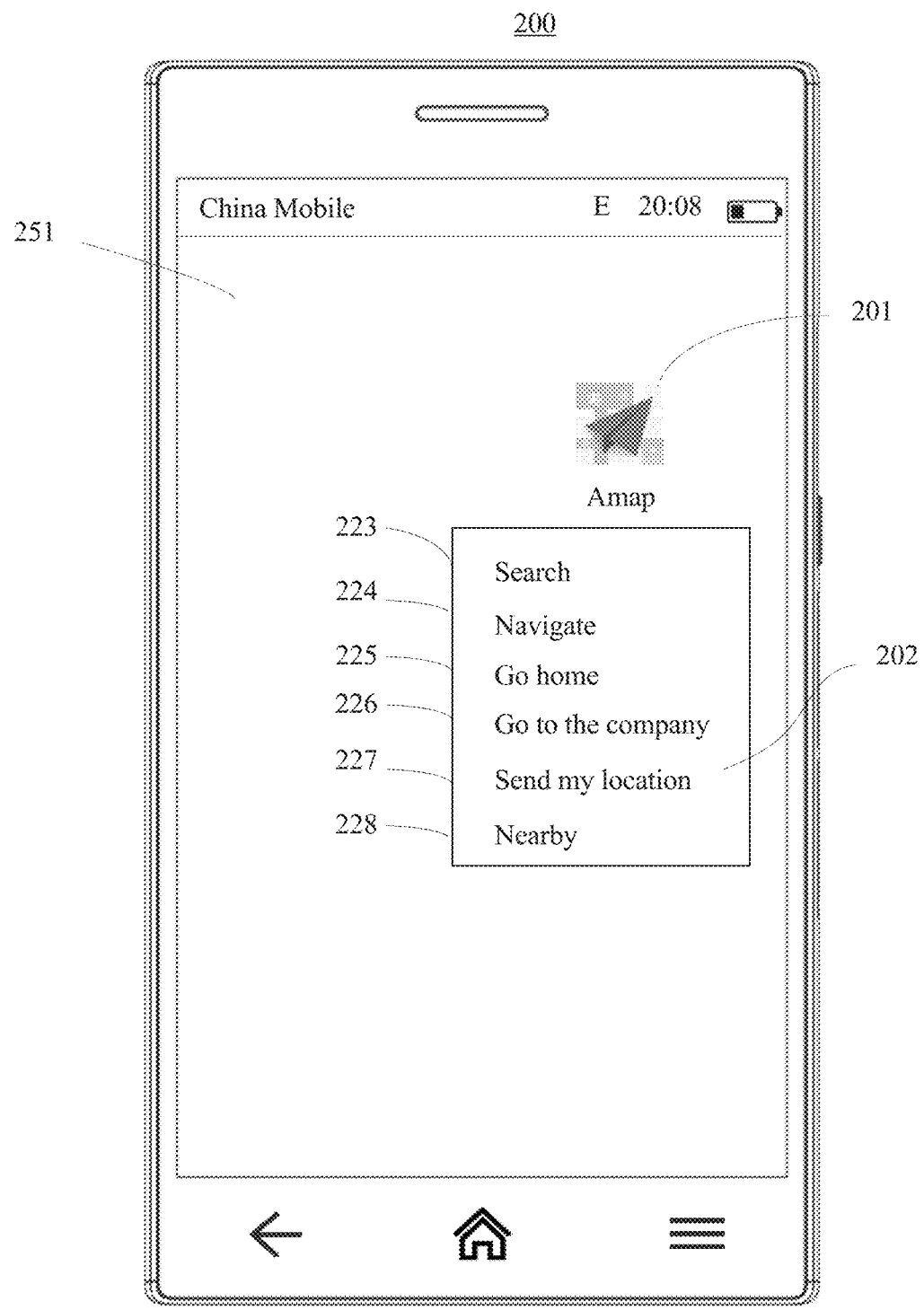

In the third case, when the user heavily presses the icon 201 at night, the processor 180 determines, based on Table 1 recorded in the learning phase, that an operation that is in the main interface and that is most commonly used by the user at night is "Search", and an operation most commonly used in the level-2 functional interface is "Navigate". Therefore, as shown in FIG. 4(c), operation options 223 to 228 arranged from top to bottom in the menu 202 are respectively: 223 "Search", 224 "Navigate", 225 "Go home", 226 "Go to the company", 227 "Send my location", and 228 "Nearby". The operation options 223 and 224 are determined based on times at which the user taps the operation options, and the operation options 215 to 218 are options preset by a system.

In the third case, when the user heavily presses the icon 201 in the daytime, operation options 223' to 228' that is in the menu displayed on the display screen and that is arranged from top to bottom by the processor 180 based on a statistical result in the learning phase are different from the operation options 223 to 228. Optionally, 223' is "Nearby", and 224' is "Food".

Fourth Case

Figure 4D:
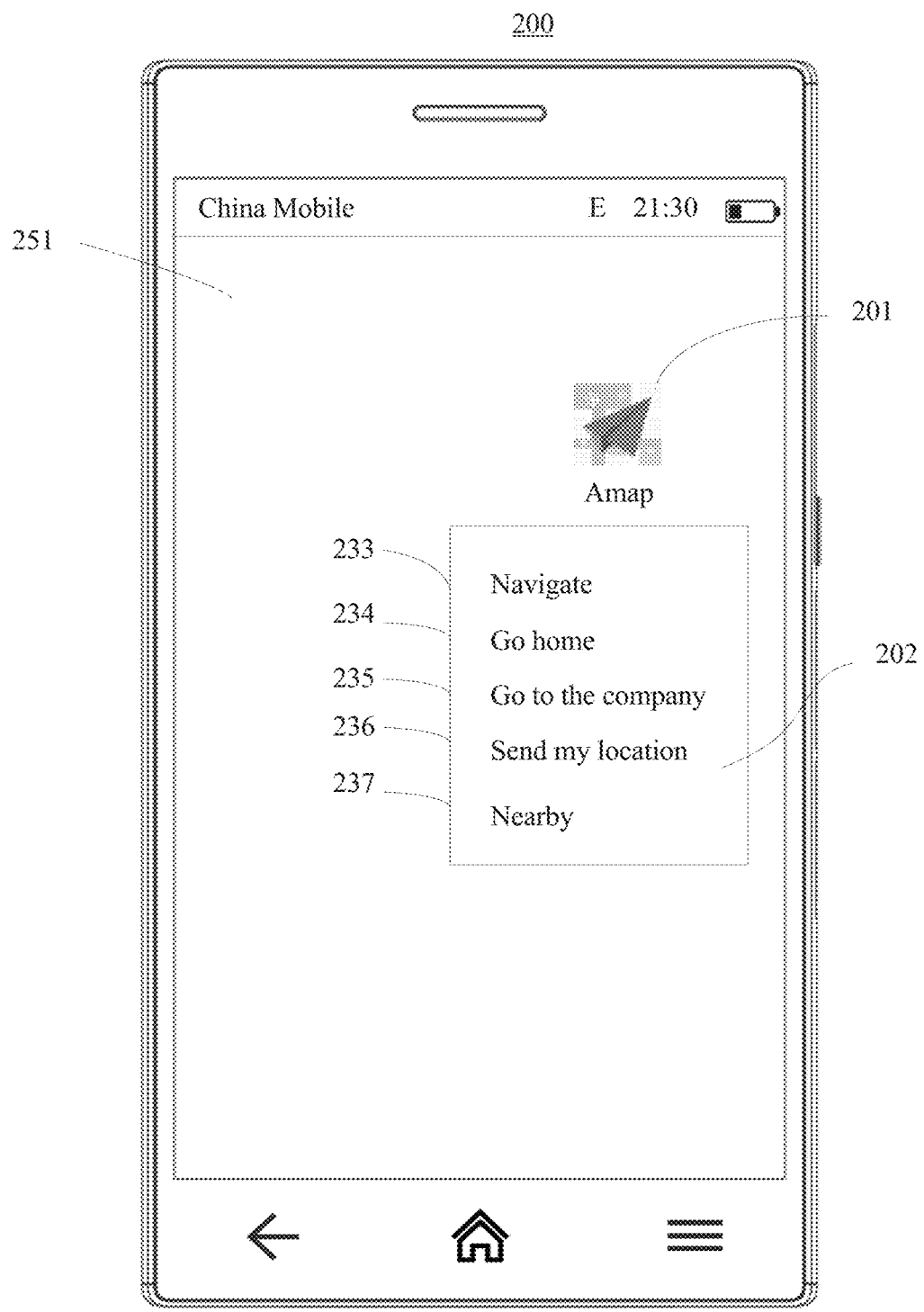

In the fourth case, when the user heavily presses the icon 201 at home at night, the processor 180 determines, based on Table 1 recorded in the learning phase, that operations previously performed by the user at the same location at the same time are both first selecting "Search" in the main interface, and then selecting "Navigate" in the level-2 functional interface. Therefore, as shown in FIG. 4(d), operation options 233 to 237 arranged from top to bottom in the menu 202 are respectively: 233 "Navigate", 234 "Go home", 235 "Go to the company", 236 "Send my location", and 237 "Nearby". The operation option 233 is determined based on both a time at which the user taps the operation option and a location of a smartphone when the user taps the operation option, and the operation options 234 to 237 are options preset by a system.

In the first to fourth cases, operation options include an operation option determined based on a quantity of times that the user taps the operation option, a tapping time, and/or a location of a smartphone when the user taps the operation option, and also include an operation option preset by a system. Optionally, an operation option in the menu 202 displayed in response to a heavy press is an operation option determined based on a quantity of times that the user taps the operation option, a tapping time, and/or a location of a smartphone when the user taps the operation option, where the menu 202 does not include the operation option present by the system.

Fifth Case

Figure 5A:
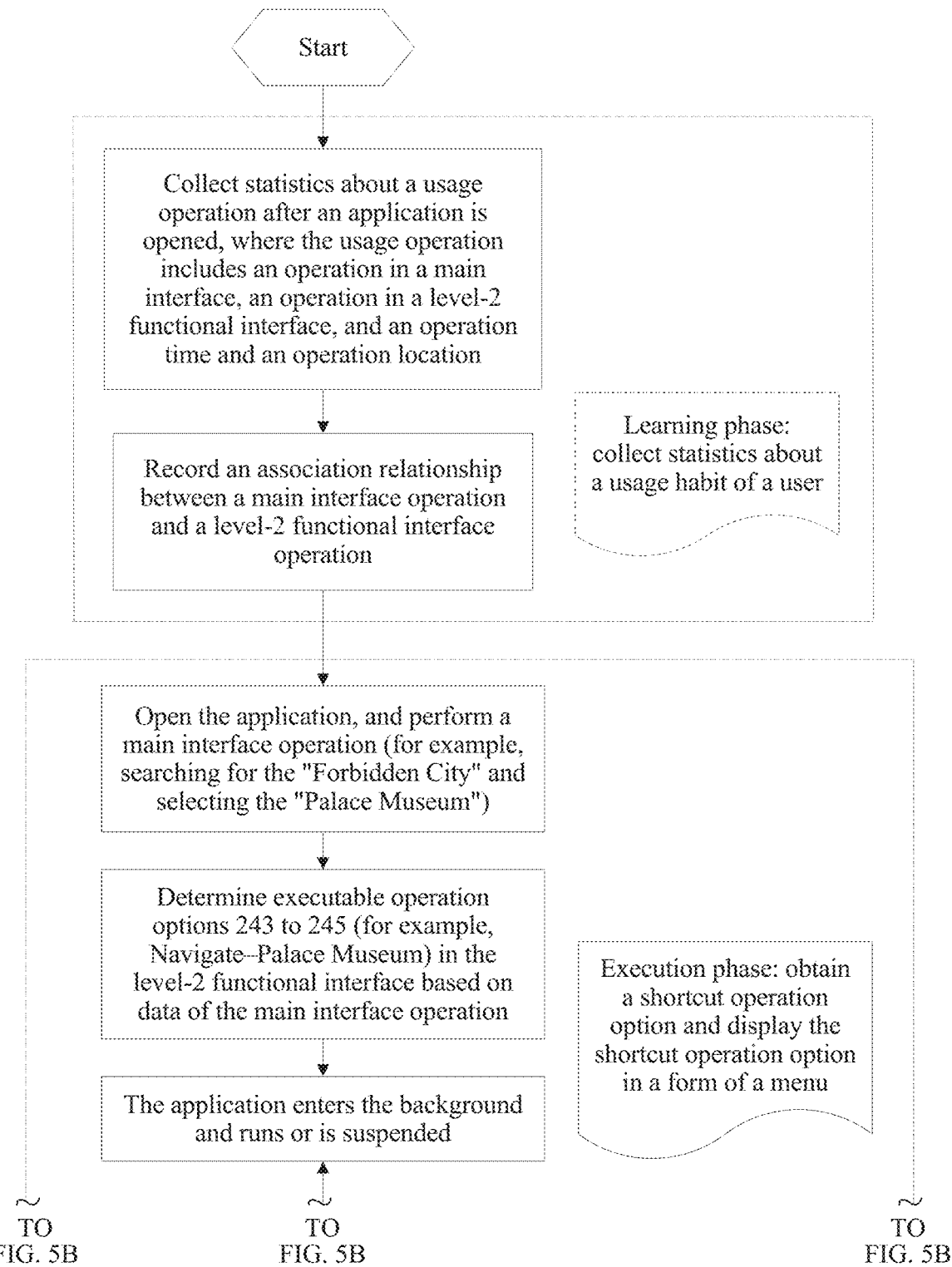
FIG. 5A and FIG. 5B are a schematic flowchart for determining and displaying an operation option in a map application according to an embodiment of this application.
Figure 5B:
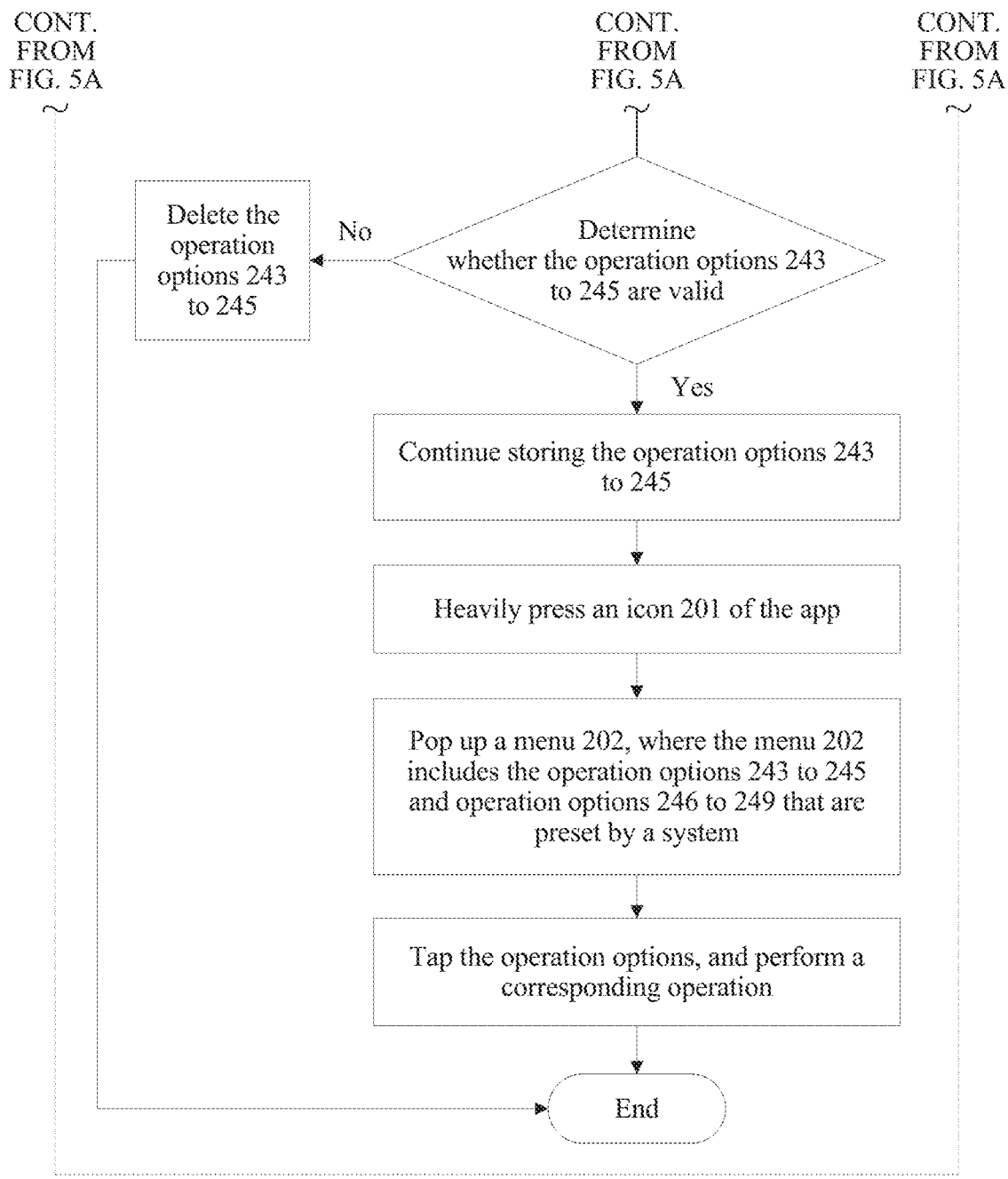

In the fifth case, as shown in FIG. 5A and FIG. 5B, statistics about a usage operation of the user are collected in the learning phase, and the usage operation includes an operation after a main interface is opened, an operation in a level-2 functional interface, and an operation time and an operation location. In addition, an association relationship between a main interface operation and a level-2 functional interface operation is further recorded in the learning phase. In the execution phase, when the user uses a map application, the user selects "Search" from the operation options in the main interface, enters the "Forbidden City" into an input box, and then selects the "Palace Museum" in a search result provided by the map application.

The processor 180 determines executable operation options 243 to 245 in the level-2 functional interface based on operation data of the main interface. For example, the operation options include 243 "Navigate-Palace Museum", 244 "Search nearby-Palace Museum", and 245 "Go-Palace Museum".

In this case, an operation performed by the user on the map application may be interrupted by another event (the another event is, for example, that the smartphone 200 receives an incoming call, and the user opens a phone application to answer the call), and the map application is switched to the background to run or is suspended after running in the background for a time period. For example, the map application may remain online for 5 minutes after entering the background. In this case, the map application may still receive data. For example, the map application may periodically determine a current location of the smartphone 200. After the map application enters the background for 5 minutes, the map application is suspended. In other words, the map application no longer receives and sends data.

When the processor 180 detects that the map application is in a background running state or in a suspended state, the processor 180 obtains data obtained before the map application is suspended and data obtained when the map application runs in the background, and determines a currently executable operation option based on the foregoing data.

When the currently executable operation option is determined, whether the operation options 243 to 245 are valid needs to be determined. If the operation options 243 to 245 are invalid (to be discussed in the following sixth case), the operation options 243 to 245 are deleted. Alternatively, if the operation options 243 to 245 are valid (still executable), the operation options 243 to 245 are still stored.

Figure 4E:
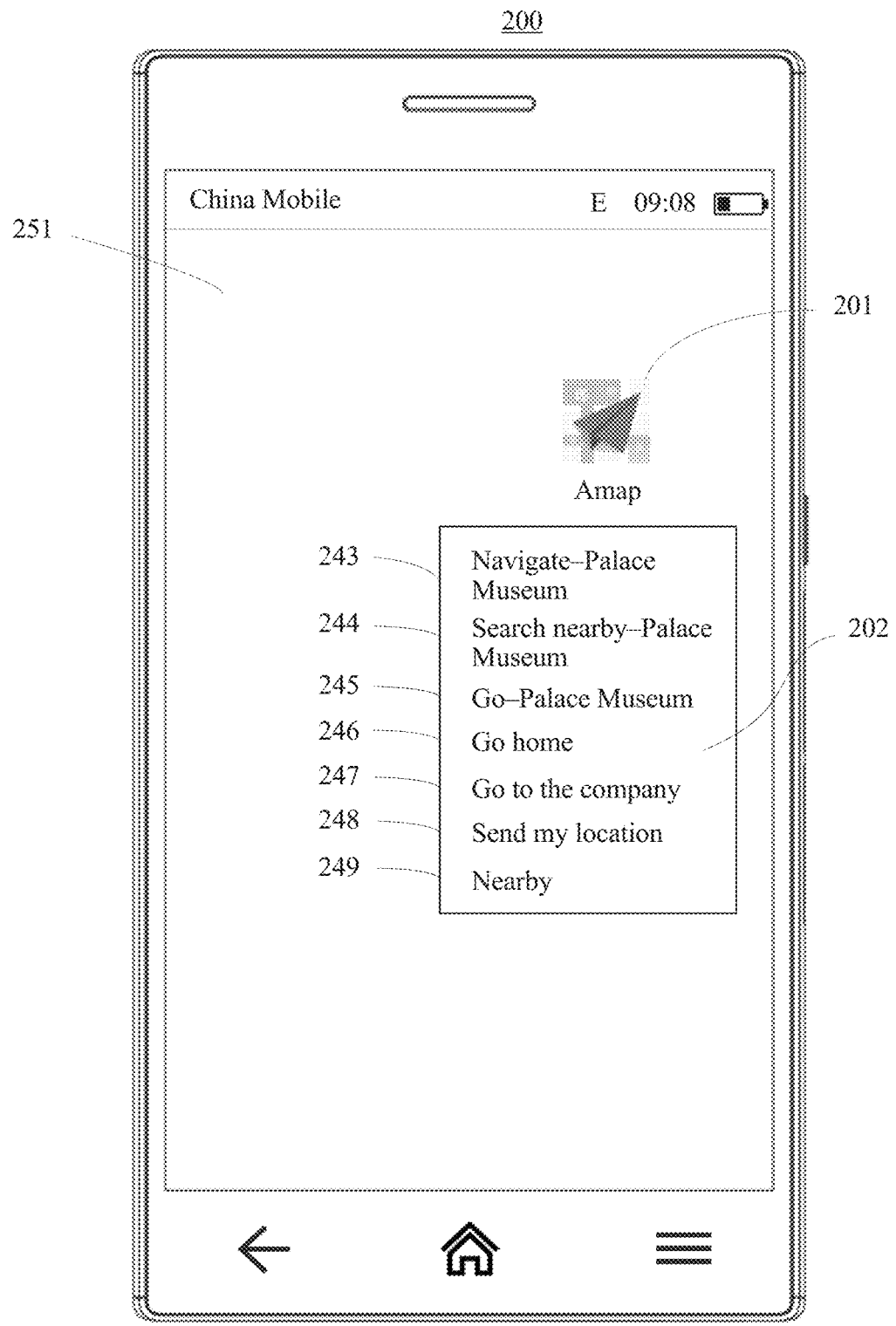

After answering the call, the user heavily presses the icon 201 of the map application on a screen of the mobile phone 200 by using a finger. As shown in FIG. 4(e), in this case, the processor 180 enables the smartphone 200 to display the menu 202 on a display screen 251 of the smartphone 200. The menu 202 is used to inform the user of the currently executable operation options 243 to 249 in the map application. The operation options 243 "Navigate-Palace Museum", 244 "Search nearby-Palace Museum", and 245 "Go-Palace Museum" are determined based on the data obtained before the map application is suspended, and the operation options 246 "Go home", 247 "Go to the company", 248 "Send my location", and 249 "Nearby" are options preset by a system.

Optionally, the operation options in the menu 202 include 243 "Navigate-Palace Museum", 244 "Search nearby-Palace Museum", and 245 "Go-Palace Museum". The operation options 243 to 245 are all valid operation options determined based on the data obtained before the application is suspended. In this case, the menu 202 does not include the options preset by the system.

Optionally, the operation options in the menu 202 include 243, 244, and 246 to 249. The processor 180 determines, based on Table 1 recorded in the learning phase, that a next operation most commonly used by the user after "Search" is "Navigate", and a relatively commonly-used operation is "Search nearby". In other words, the processor 180 determines the operation option 243 "Navigate-Palace Museum" and 244 "Search nearby-Palace Museum" based on quantities of times that the operation options are tapped and the data obtained before the application is suspended.

Optionally, the operation options in the menu 202 include 243 and 246 to 249.

In the fifth case, after the user selects the "Palace Museum", the map application is immediately switched to the background to run or is suspended after running in the background for a time period. Optionally, after the operation of the user has been performed for a time period, the map application is switched to the background. The data obtained before the application is suspended includes data of all operations after the application is opened.

Sixth Case

A difference between the sixth case and the fifth case is that, before the operation performed by the user on the map application is interrupted by the another event, the user further performs an operation on the map application.

For example, the further operation performed by the user on the map application is closing the application, deleting the search result "Palace Museum" in the previous operation, performing a new search, or viewing details about the "Palace Museum". The processor 180 determines, at a predetermined interval based on latest data of the already performed operation, whether the determined operation option is valid, adjusts the operation option in real time, reserves a valid and executable operation option, and deletes an invalid operation option. For example, when the map application is closed, all operation options 243 to 249 are deleted. When the user deletes the search result "Palace Museum" from the map application, the operation options 243 "Navigate-Palace Museum", 244 "Search nearby-Palace Museum", and 245 "Go-Palace Museum" are invalid operation options, the operation options 243 to 245 are deleted, and the operation options 246 to 249 are reserved. When the user deletes the search result "Palace Museum" from the map application and newly searches for "Tian'anmen", and further selects the "Tian'anmen Square", new operation options 253 to 255 are generated to replace the invalid operation options 243 to 245 in the operation options, the operation option 253 is "Navigate-Tian'anmen Square", 254 is "Search nearby-Tian'anmen Square", 255 is "Go-Tian'anmen Square", and the valid operation options 246 to 249 remains unchanged. When the user views only the details in the map application, all the foregoing operation options 243 to 249 are still stored.

Herein, how an operation option included in the menu 202 changes is described by using an example in which the further operation of the user is searching for "Tian'anmen" and selecting the "Tian'anmen Square".

The map application is subsequently switched to the background to run or is suspended after running in the background for a time period. This is the same as the fifth case. In this case, the processor 180 stores the data obtained before the map application is suspended.

Figure 4F:
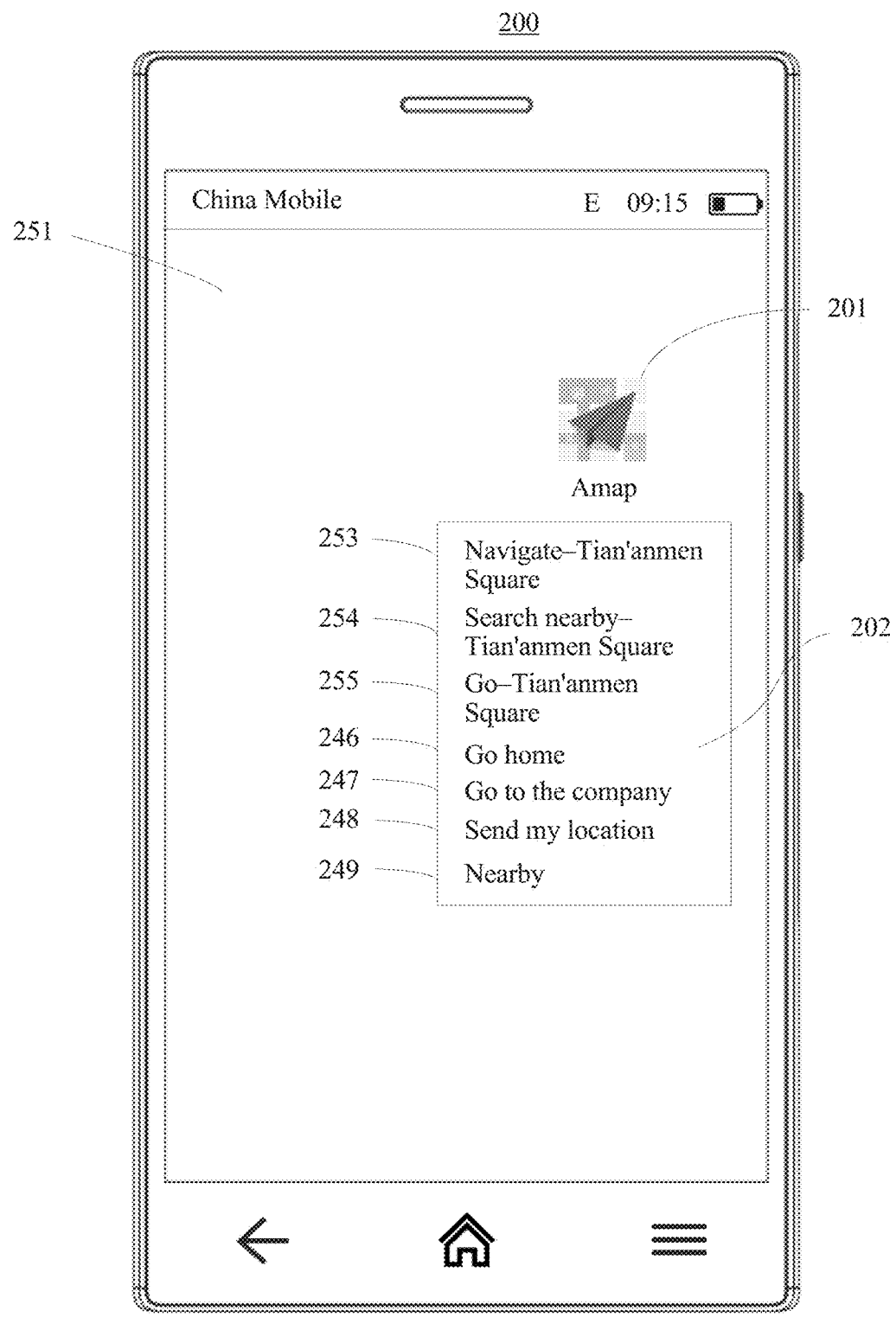

After answering a call, the user heavily presses the icon 201 of the map application on a screen of a mobile phone 200 by using a finger. As shown in FIG. 4(f), in this case, the processor 180 enables the smartphone 200 to pop up the menu 202 on a display screen 251 of the smartphone 200. The menu 202 is used to inform the user of the currently executable operation options 253 to 255 and 246 to 249 in the map application. The operation options 253 to 255 are determined based on the data obtained before the application is suspended.

The map application can receive and send data when running in the background, and the processor 180 can determine an operation option based on the data obtained when the application runs in the background. For example, the map application receives road condition data when running in the background, and the processor 180 determines an operation option based on the road condition data, and when a road is closed, determines that the operation option is walking.

In the foregoing fifth and sixth cases, before the user heavily presses the icon 201, the map application is switched only once to the background to run or is suspended only once after running in the background for a time period. Optionally, a quantity of times that the map application is switched to the background to run or is suspended in the background may be greater than 1.

Each time the map application is switched from the background running state or the suspended state to an active state, the user may operate the map application. The processor 180 stores the data obtained before the map application is suspended and the data obtained when the map application runs in the background, and determines, based on the data, the operation option displayed in the menu.

In the foregoing fifth and sixth cases, the operation options include the operation option determined based on the data obtained before the map application is suspended, and also include an operation option preset by a system. Optionally, the operation option that is in the menu 202 displayed in response to the heavy press is the operation option determined based on the data obtained before the map application is suspended, and does not include the operation option preset by the system.

In the foregoing first to sixth cases, at least one of the operation options is determined based on a quantity of times that the user taps the operation option, a tapping time, a location of the smartphone when the user taps the operation option, the data obtained when the application runs in the background, and/or the data obtained before the application is suspended. The operation options are arranged based on a usage habit of the user. For example, the operation options are arranged from top to bottom in descending order of quantities of times that the operation options are tapped. Because content in the menu 202 more conforms to a habit of the user, the user may conveniently tap an operation option arranged on the top, to perform a corresponding operation, improving usage experience of the user.

Second Embodiment

When an application has unread information, statistics about different operations performed when a user views the unread information is collected in a learning phase. The unread information includes a missed call, an unread short message service message, an unread instant messaging message, or an unread notification message.

Figure 6A:
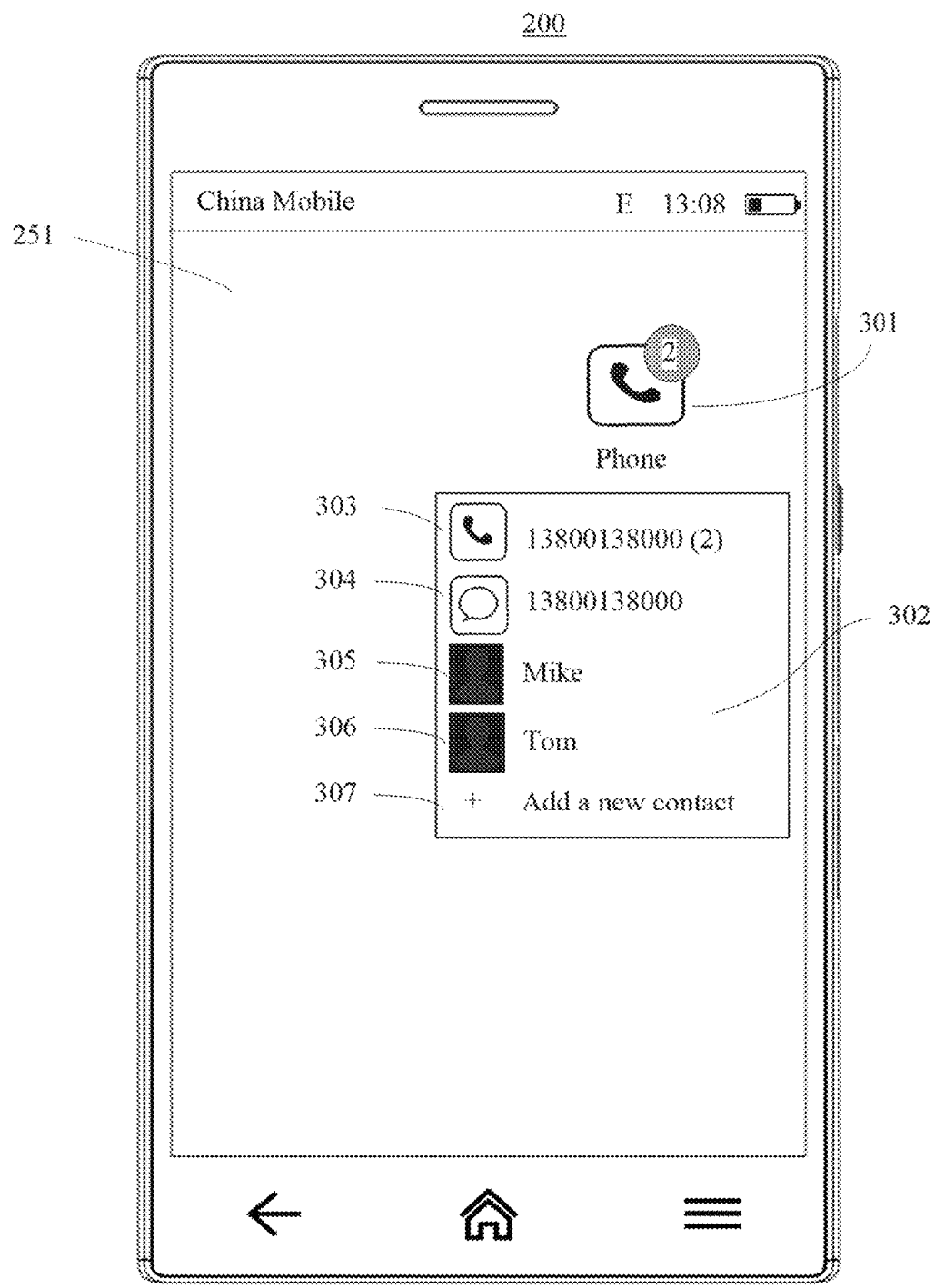
FIG. 6(a) and FIG. 6(b) are schematic diagrams of an operation option displayed when a phone application icon is heavily pressed according to an embodiment of this application.
Figure 6B:
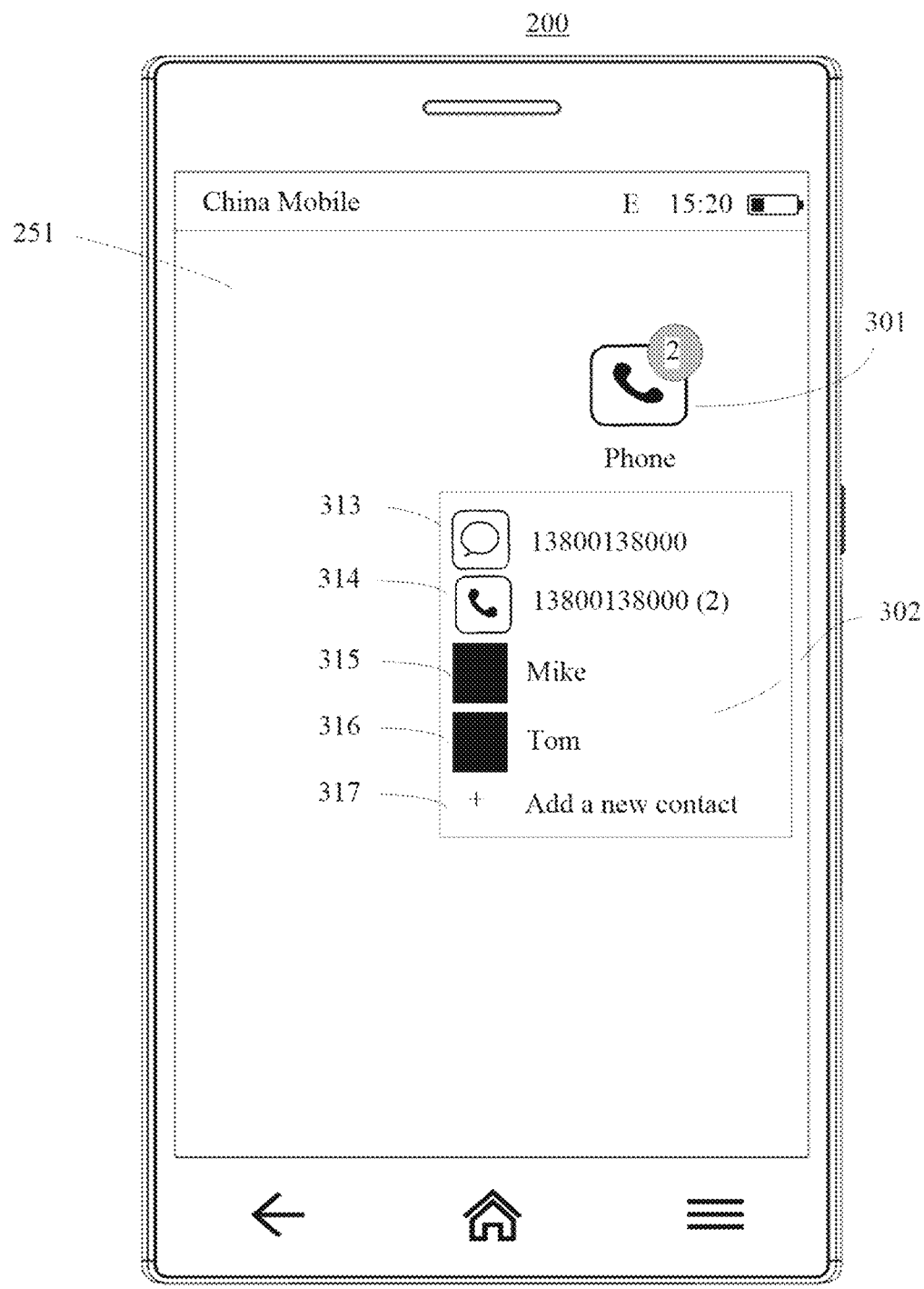

Referring to content shown in FIG. 6(*a*) and FIG. 6(*b*), an operation process of a phone application corresponding to an application icon 301 is described by using the phone application as an example.

In the learning phase, the processor 180 records a process of using the phone application by the user each time. For example, based on a statistical result, for the phone application, without considering a time factor and a location factor, when there is a missed call, an operation performed by the user a largest quantity of times is "viewing a missed call+dialing back for the missed call". When the location factor is considered, an operation performed by the user a largest quantity of times in a company is "viewing a missed call+sending a short message service message for the missed call".

In an execution phase, the processor 180 determines a currently executable operation option and displays the operation option in a form of a menu 302 to the user.

When the phone application has a missed call, the processor 180 displays a missed call notification message on the display screen 251, for example, displays "2" indicating a quantity of missed calls in an upper right corner of the icon 301. Further, the processor 180 stores number information 13800138000 of the missed call, and the processor 180 determines an operation option of an executable operation based on the statistical result in the learning phase. For example, the operation option includes 303 "View the missed call and dial back for the missed call 13800138000", 304 "View the missed call and send a short message service message to the missed call 13800138000" 305 "Call a contact Mike", 306 "Call a contact Tom", and 307 "Add a new contact".

When the user heavily presses the icon 301, as shown in FIG. 6(*a*), the processor 180 displays the menu 302 on the display screen 251 in response to the heavy press. The operation options 303 to 307 are sequentially arranged from top to bottom in the menu 302. The operation options 303 and 304 are based on the unread information in the application, the operation options 305 and 306 are based on quantities of times that the operation options are tapped, and the contact Mike corresponding to the operation option 305 is a contact that is called by the user a largest quantity of times. The operation option 307 is an option preset by a system.

Optionally, when the user heavily presses the icon 301 in a company, because an operation performed by the user in the company a largest quantity of times is "viewing a missed call+sending a short message service message for the missed call", as shown in FIG. 6(*b*), arrangement locations of the operation options "View the missed call and dial back for the missed call 13800138000" and "View the missed call and send a short message service message for the missed call 13800138000" in the menu 302 are exchanged.

Optionally, the operation options in the menu 302 include 303 and 305 to 307. In other words, the operation option determined based on the unread information in the application includes only the operation option 303 that is most commonly used by the user.

Optionally, the processor 180 adjusts content in an operation option based on data obtained before the application is suspended. For example, when the missed call 13800138000 has been browsed, the operation options 303 and 304 are deleted; when the missed call 13800138000 is not browsed, the operation options 303 and 304 are still stored.

Optionally, the application corresponding to the icon 301 may be an application market, and there is unread notification information of one or more to-be-updated applications in the application market. When the user heavily presses the icon 301 of the application market by using a finger, the menu 302 includes an operation option 308 "Update all".

Optionally, the application corresponding to the icon 301 may be another application such as Messages, QQ, WeChat, or Mail. The processor determines at least one operation option in the menu 302 based on the unread information in the application, and the unread information includes a missed call, an unread short message service message, an unread mail, an unread instant messaging message, an unread notification message, or the like. The at least one operation option included in the menu 302 is determined based on the unread information in the application.

Third Embodiment

Referring to content shown in FIG. 7(*a*) and FIG. 7(*b*), an operation process of a short message service message application corresponding to an icon 401 is described by using the short message service message application as an example.

In a learning phase, a processor 180 records and collects statistics about a usage operation performed by a user on the short message service message application, and stores a result in a memory 160 in a format of the following Table 2.

TABLE 2

Short message service message

| Number | Contact receiving or sending a short message service message | Receiving time or sending time |
| --- | --- | --- |
| 1 | Mike | 20160526100830 |
| 2 | Tom | 20160525231000 |
| 3 | Jack | 20160525124550 |
| 4 | Mary | 20160419062237 |
| 5 | Tracy | 20160320090830 |
| 6 | . . . | . . . |

A record having a number of 1 indicates that a contact receiving or sending a short message service message is Mike, and a time for receiving or sending a short message service message is 2016/5/26 10:08:30. Referring to the record having the number of 1, content indicated by a remaining record can be understood.

When the same contact performs a new operation of receiving or sending a short message service message, the original time in Table 2 is covered by using latest time for performing the receiving or sending operation.

Optionally, a time and/or a location for using the short message service message application by the user are/is further recorded in Table 2. For example, the time may be divided into two time periods in the first embodiment: in the daytime and at night, and the location may be divided into two locations: at home and in a company.

The processor obtains a communication object in the application. The communication object in the short message service message application provided in this embodiment is a contact. The processor arranges the contact. The arrangement is performed based on a time for communicating with the contact (the time for receiving or sending a short message service message). An earlier communication time indicates lower arranged location. For example, for a fifth record in Table 2, because of an earliest time for receiving or sending a short message service message, the contact Tracy corresponding to the fifth record is arranged at the bottom during arrangement.

In an execution phase, the processor 180 determines an operation option based on the communication object in the application. The processor extracts first n (1<n≤5) contacts from a sequence of contacts, and generates operation options corresponding to the n contacts.

As shown in 7(a), when n=4, operation options 403 to 406 arranged from top to bottom in a menu 402 displayed in response to the heavy press are respectively: 403 "Send a short message service message to Mike", 404 "Send a short message service message to Tom", 405 "Send a short message service message to Jack", and 406 "Send a short message service message to Mary".

Figure 7A:
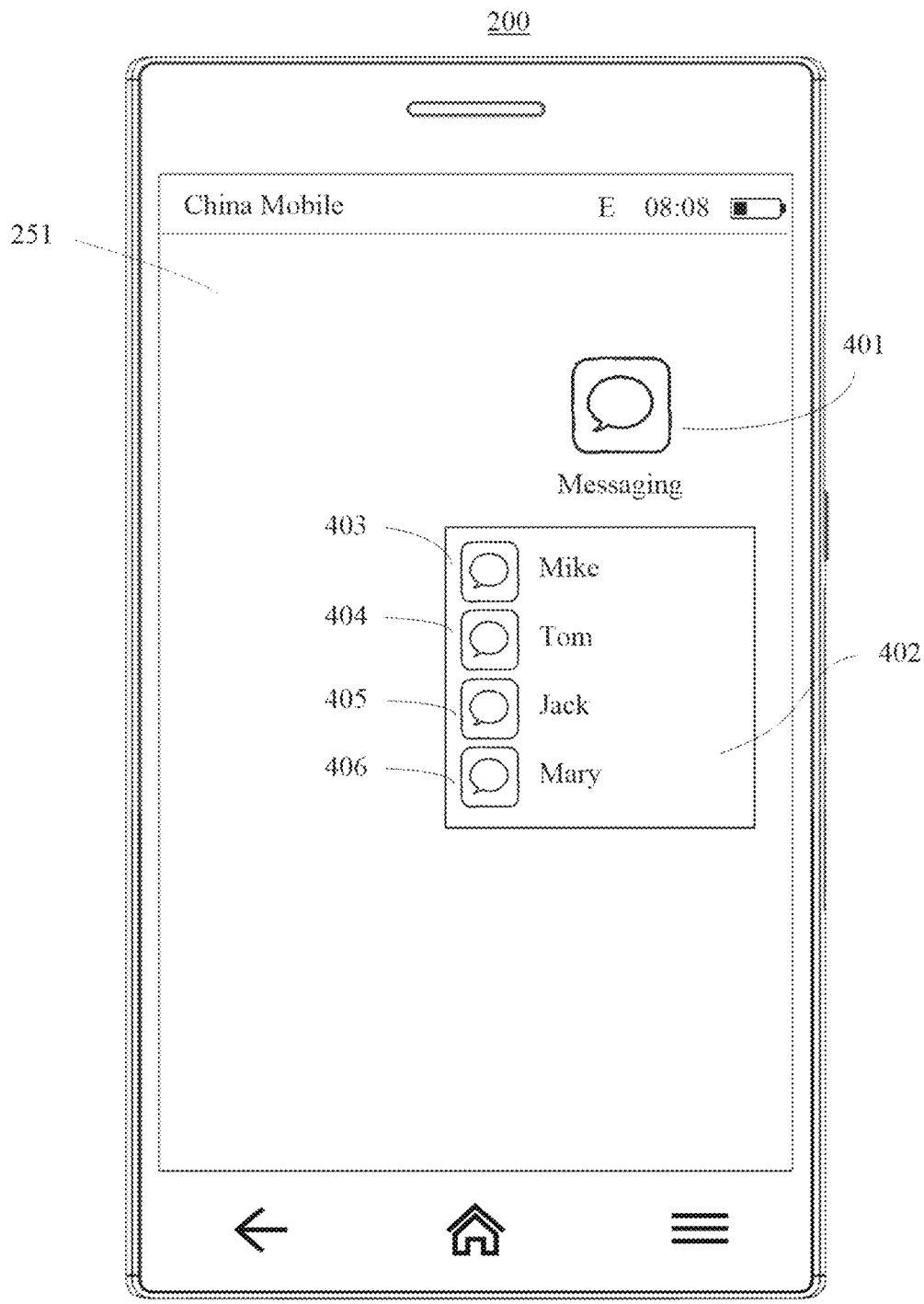
FIG. 7(a) and FIG. 7(b) are schematic diagrams of an operation option displayed when a short message service message application icon is heavily pressed according to an embodiment of this application.
Figure 7B:
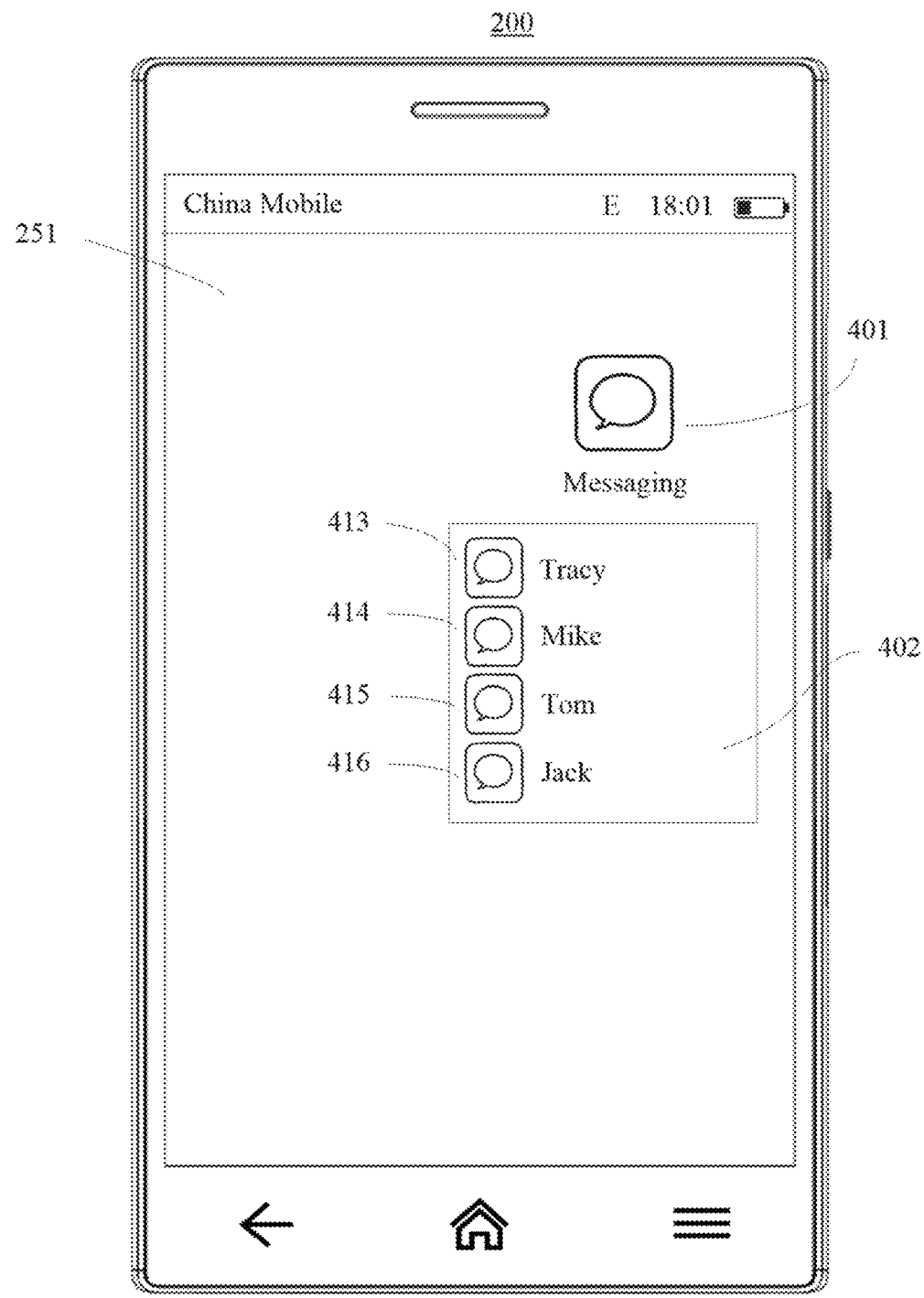

In the execution phase, the processor 180 further detects whether a record is newly added to Table 2. When there is a newly added record before the application is suspended or when the application runs in the background, for example, a short message service message sent by the contact Tracy is received at 2016/5/26 18:00:00, in this case, the operation option 406 arranged at the bottom in FIG. 7(a) is deleted, and an operation option 413 corresponding to the newly added communication object Tracy is generated. As shown in FIG. 7(b), the operation option 413 corresponding to the newly added communication object is arranged on the top when an application icon 401 is heavily pressed. Correspondingly, the operation options 403 to 405 in FIG. 7(a) are sequentially adjusted to operation options 414 to 416 in FIG. 7(b).

Optionally, when there is no record of the newly added communication object in Table 2, a record related to the communication object is added to Table 2.

In this embodiment, the operation options are arranged based on times for communicating with the communication object, and the operation options are arranged based on times for communicating with communication objects from late to early that correspond to the operation options. A late time for communicating with the communication object indicates that the time for communicating with the communication object is relatively late. In other words, the time for communicating with the communication object is closer to a moment at which the heavy press occurs. Optionally, the processor 180 arranges the operation options based on quantities of times of communicating with the communication object.

In this embodiment, generated operation options corresponding to n communication objects are described by using an example. Optionally, the operation options included in the menu 402 are all determined based on the communication objects.

Optionally, content of an operation option is adjusted based on a time and/or a location for heavily pressing the icon 401 by the user, so that at least one operation option is determined based on a location of a smartphone when the user taps the operation option and/or a tapping time. A specific adjustment manner is similar to the adjustment manner in the foregoing embodiment, and details are not described herein again.

In the third embodiment, that the processor 180 determines the operation option based on the communication object in the application is described by using the short message service message application as an example, and the operation options are arranged from top to bottom in the menu in descending order of quantities of times of communicating with the communication object or based on the communication time from late to early.

The operation option determined based on the communication object in the application includes information about the communication object. In the short message service message application, the information about the communication object is a phone number. When the application corresponding to the icon 401 is another application other than the short message service message, the information about the communication object includes but is not limited to any one of the phone number, an application account number, a mail address, a user identifier, and a user name.

Optionally, the application corresponding to the icon 401 is Phone, Mail, Mobile banking, WeChat, or another social application, and the user communicates with another communication object by using the application corresponding to the icon 401. In the application corresponding to the icon 401, the processor 180 determines, based on the communication object in the application, the operation option displayed in the menu.

Optionally, the operation option determined based on the communication object in the application includes information about a family member or information about a particular contact, and the operation option including the information about the family member or the information about the particular contact may be arranged on the top of the menu.

Fourth Embodiment

The processor 180 may record and collect statistics about commonly-used applications of a user in different time periods and at different locations, and usage operations performed on the application in the different time periods and at the different locations. For example, at a location, a commonly-used application of the user is "Alipay", and operations that are most frequently used in the "Alipay" application at the location are "Pay" and "Scan". Optionally, the location is a supermarket near a house of the user.

In an execution phase, the processor 180 first determines a location of the mobile phone 200 by using the location positioning module 115. For example, the location is the supermarket near the house of the user. Therefore, when the user heavily presses an icon of the Alipay application on a screen of the mobile phone 200 by using a finger, the processor 180 enables the smartphone 200 to display a menu on the display screen 251 of the smartphone 200, and the menu includes the operation options "Pay" and "Scan" based on the location of the electronic device. If the location determined by using the location positioning module 115 is a residence of the user, operation options included the menu displayed when the heavy press is performed are "Transfer" and "Yu'E Bao" that are most frequently used by the user at home.

Optionally, in the execution phase, the processor 180 first determines a current time. If the current time is one day before a statement date of a credit card of the user, the operation option included in the menu that pops up when the heavy press is performed is "Transfer" that is most frequently used by the user before the statement date.

In addition to the foregoing listed cases, a person skilled in the art may obtain a plurality of implementations through expansion. For example, when the location positioning module 115 determines that the location of the mobile phone 200 is a scenic spot, the user heavily presses an icon of a camera application by using a finger. In this case, the menu includes a thumbnail of a picture took by another user in the scenic spot, to provide reference of framing and image composition and/or a photographing location for the user. For example, when an application icon is a music-type application, when a song sung by a singer M is being played before the application is suspended, operation options that may be included in the menu displayed in response to a heavy press are "Play all songs of the singer M" and "Search for all songs of the singer M".

Referring to the first to fourth embodiments, the scenarios to which this application is applied is described by using the examples. Optionally, operations corresponding to operation options in a menu include a commonly-used operation preset by a system and an operation determined based on statistics. Optionally, the operations corresponding to the operation options in the menu include all operations that can be executed in an interface of the application.

The method steps described with reference to the content disclosed in this application may be implemented in a hardware manner, or may be implemented in a manner of executing a software instruction by a processor. The software instruction may include a corresponding software module. The software module may be stored in a RAM memory, a flash memory, a ROM memory, an EPROM memory, an EEPROM memory, a register, a hard disk, a removable hard disk, a CD-ROM memory, or a storage medium in any other forms well-known in the art. An example storage medium is coupled to the processor, so that the processor can read information from the storage medium, and can write information into the storage medium. Certainly, the storage medium may be a part of the processor. The processor and the storage medium may be located in an ASIC. In addition, the ASIC may be located in user equipment. Certainly, the processor and the storage medium may exist in the user equipment as discrete components.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium accessible to a computer, or a data storage device integrating one or more usable media, such as a server or a data center. The usable medium may be a magnetic medium (for example, a floppy disk, a hard disk, or a magnetic tape), an optical medium (for example, a DVD), a semiconductor medium (for example, a solid state disk Solid State Disk, (SSD)), or the like.

In the foregoing specific implementations, the objective, technical solutions, and benefits of this application are further described in detail. It should be understood that the foregoing descriptions are merely specific implementations of this application, but are not intended to limit the protection scope of this application. Any modification, equivalent replacement, or improvement made based on the technical solutions of this application shall fall within the protection scope of this application.

What is claimed is:

1. A method, comprising:
   displaying an application icon on a home screen page of an electronic device, wherein the application icon corresponds to one application, wherein the application provides a plurality of operations options comprising one or more main interface operations and one or more level-2 interface operations, and wherein the application enters a level-2 interface operation of the one or more level-2 interface operations after selecting a main interface operation from the one or more main interface operations;
   collecting statistics about usage of the one or more main interface operations and the one or more level-2 interface operations when the application is opened;
   recording a plurality of association relationships between the one or more main interface operations and the one or more level-2 interface operations based on the collected statistics, wherein each recorded association relationship of the recorded association relationships indicates a sequence of usage of one of the level-2 interface operations after one of the main interface operations at a respective time and a respective location;
   detecting, on a touch-sensitive surface of a display screen, a first pressing operation performed on the application icon;

displaying a first menu in response to detecting the first pressing operation performed on the application icon, wherein the first menu comprises one or more different first operation options for performing one or more different first functions provided in the one application, wherein the one or more first operation options are arranged in a first order in the first menu, wherein the one or more first operation options in the first menu comprise both a first main interface operation of the main interface operations and a first level-2 interface operation of the level-2 interface operations, and wherein each first operation option is selectable to start the application and to enable a first function of the one or more first functions that corresponds to the first operation option;

returning to the home screen page after displaying the first menu;

detecting, on the touch-sensitive surface, a second pressing operation performed on the application icon;

in response to detecting the second pressing operation performed on the application icon, displaying a second menu, wherein the second menu is different from the first menu and comprises one or more second operation options for performing one or more different second functions provided in the one application, wherein the one or more second operation options are arranged with the one or more first operation options in a second order in the second menu, wherein the one or more second operation options in the second menu comprise both a second main interface operation of the main interface operations and a second level-2 interface operation of the level-2 interface operations, wherein at least one of the one or more second operation options is not included in the one or more first operation options in the first menu, wherein the second order of the one or more second operation options in the second menu is different than the first order of the one or more operation options in the first menu, and wherein each second operation option of the second operation options is selectable to start the application and to enable a second function of the one or more second functions that corresponds to the second operation option; and adjusting a first location of the one or more first operation options in the first menu or a second location of the one or more second operation options in the second menu based on the recorded plurality of association relationships between the one or more main interface operations and the one or more level-2 interface operations.

2. The method of claim 1, further comprising adjusting the first location of the one or more first operation options or the second location of the one or more second operation options based on a quantity of times that the one or more first operation options and the one or more second operation options are tapped.

3. The method of claim 1, further comprising adjusting the first location of the one or more first operation options or the second location of the one or more second operation options based on a time at which the second pressing operation occurs.

4. The method of claim 1, further comprising adjusting the first location of the one or more first operation options or the second location of the one or more second operation options based on a third location of the electronic device when the second pressing operation occurs.

5. The method of claim 1, further comprising adjusting the first location of the one or more first operation options or the second location of the one or more second operation options based on a missed call in the application, wherein the application is a phone application, and wherein the one or more first functions and the one or more second functions include dialing a phone number of the missed call.

6. The method of claim 1, further comprising adjusting the first location of the one or more first operation options or the second location of the one or more second operation options based on unread information in the application, wherein the one or more first functions and the one or more second functions comprise viewing the unread information, replying to the unread information, or dialing a phone number from which the unread information is sent.

7. The method of claim 1, further comprising adjusting the first location of the one or more first operation options or the second location of the one or more second operation options based on data obtained before the application is suspended.

8. The method of claim 1, further comprising adjusting the first location of the one or more first operation options or the second location of the one or more second operation options based on data obtained when the one application runs in a background on the electronic device.

9. The method of claim 1, further comprising adjusting the first location of the one or more first operation options or the second location of the one or more second operation options based on a time for communicating with a communication object of the application.

10. The method of claim 9, wherein the communication object comprises a phone number, an application account number, a mail address, a user identifier, or a user name.

11. An electronic device, comprising:
a display screen;
a processor coupled to the display screen; and
a memory coupled to the processor and storing instructions that, when executed by the processor, cause the electronic device to be configured to:
display an application icon on a home screen page of the electronic device, wherein the application icon corresponds to one application, wherein the application provides a plurality of operations options comprising one or more main interface operations and one or more level-2 interface operations, and wherein the application enters a level-2 interface operation of the one or more level-2 interface operations after selecting a main interface operation from the one or more main interface operations;
collect statistics about usage of the one or more main interface operations and the one or more level-2 interface operations when the application is opened;
record a plurality of association relationships between the one or more main interface operations and the one or more level-2 interface operations based on the collected statistics, wherein each recorded association relationship of the recorded association relationships indicates a sequence of usage of one of the level-2 interface operations after one of the main interface operations at a respective time and a respective location;
detect, on a touch-sensitive surface of the display screen, a first pressing operation performed on the application icon;
display a first menu in response to detecting the first pressing operation performed on the application icon, wherein the first menu comprises one or more first operation options for performing one or more different first functions provided in the one application and respectively, wherein the one or more first operation options are arranged in a first order in the first menu, wherein the one or more first operation options in the first menu comprise both a first main interface operation of the main interface operations and a first level-2 interface operation of the level-2 interface operations, and wherein each first operation option of the one or more first operation options is selectable to start the application and to enable a first function of the one or more first functions that corresponds to the first operation option;

return to the home screen page after displaying the first menu;

detect, on the touch-sensitive surface, a second pressing operation performed on the application icon;

in response to detecting the second pressing operation performed on the application icon, display a second menu, wherein the second menu is different from the first menu and comprises one or more second operation options for performing one or more different second functions provided in the one application, wherein the one or more second operation options are arranged with the one or more first operation options in a second order in the second menu, wherein the one or more second operation options in the second menu comprise both a second main interface operation of the main interface operations and a second level-2 interface operation of the level-2 interface operations, wherein at least one of the one or more second operation options is not included in the one or more first operation options in the first menu, wherein the second order of the one or more second operation options in the second menu is different than the first order of the one or more operation options in the first menu, and wherein each second operation option of the one or more second operation options is selectable to start the application and to enable a second function of the one or more second functions that corresponds to the second operation option; and adjust a first location of the one or more first operation options in the first menu a second location of of the one or more second operation options in the second menu based on the recorded plurality of association relationships between the one or more main interface operations and the one or more level-2 interface operations.

12. The electronic device of claim 11, wherein the instructions further cause the electronic device to adjust the first location of the one or more first operation options or the second location of the one or more second operation options into the second order in the second menu based on a quantity of times that the one or more first operation options and the one or more second operation options are tapped.

13. The electronic device of claim 11, wherein the instructions further cause the electronic device to adjust the first location of the one or more first operation options or the second location of the one or more second operation options into the second order in the second menu based on a time at which the second pressing operation occurs.

14. The electronic device of claim 11, wherein the instructions further cause the electronic device to adjust the first location of the one or more first operation options or the second location of the one or more second operation options into the second order in the second menu based on a location of the electronic device when the second pressing operation occurs.

15. The electronic device of claim 11, wherein the instructions further cause the electronic device to adjust the first location of the one or more first operation options or the second location of the one or more second operation options into the second order in the second menu based on a missed call in the application, wherein the application is a phone application, and wherein the one or more first functions and the one or more second functions include dialing a phone number of the missed call.

16. The electronic device of claim 11, wherein the instructions further cause the electronic device to adjust the first location of the one or more first operation options or the second location of the one or more second operation options into the second order in the second menu based on unread information in the application, and wherein the one or more first functions and the one or more second functions comprise viewing the unread information, replying to the unread information, or dialing a phone number from which the unread information is sent.

17. The electronic device of claim 11, wherein the instructions further cause the electronic device to adjust the first location of the one or more first operation options or the second location of the one or more second operation options into the second order in the second menu based on data obtained before the application is suspended.

18. The electronic device of claim 11, wherein the instructions further cause the electronic device to adjust the first location of the one or more first operation options or the second location of the one or more second operation options into the second order in the second menu based on data obtained when the one application runs in a background on the electronic device.

19. The electronic device of claim 11, wherein the instructions further cause the electronic device to adjust the first location of the one or more first operation options or the second location of the one or more second operation options into the second order in the second menu based on a time for communicating with a communication object of the application.

20. The electronic device of claim 19, wherein the communication object comprises a phone number, an application account number, a mail address, a user identifier, or a user name.

\* \* \* \* \*